(12) United States Patent
Su et al.

(10) Patent No.: US 10,778,341 B2
(45) Date of Patent: Sep. 15, 2020

(54) QUANTUM COMMUNICATION METHOD AND RELATED APPARATUS

(71) Applicant: Huawei Technologies Co., Ltd., Shenzhen, Guangdong, P.R. (CN)

(72) Inventors: Changzheng Su, Shenzhen (CN); Liangliang Lu, Shenzhen (CN)

(73) Assignee: HUAWEI TECHNOLOGIES CO., LTD., Shenzen, Guangdong (CN)

( * ) Notice: Subject to any disclaimer, the term of this patent is extended or adjusted under 35 U.S.C. 154(b) by 0 days.

(21) Appl. No.: 16/206,452

(22) Filed: Nov. 30, 2018

(65) Prior Publication Data

US 2019/0109651 A1 Apr. 11, 2019

Related U.S. Application Data

(63) Continuation of application No. PCT/CN2017/076830, filed on Mar. 15, 2017.

(30) Foreign Application Priority Data

Jun. 2, 2016 (CN) .......................... 2016 1 0388547

(51) Int. Cl.
*H04B 10/70* (2013.01)
*H04B 10/2537* (2013.01)
(Continued)

(52) U.S. Cl.
CPC ......... *H04B 10/70* (2013.01); *H04B 10/2537* (2013.01); *H04B 10/506* (2013.01); *H04J 14/02* (2013.01)

(58) Field of Classification Search
CPC .. H94B 10/70; H94B 10/2537; H94B 10/506; H04B 10/70; H04B 10/2537; H04B 10/506
See application file for complete search history.

(56) References Cited

U.S. PATENT DOCUMENTS 7,248,695 B1 7/2007 Beal et al.
7,613,396 B2 11/2009 Maeda et al.
(Continued)

FOREIGN PATENT DOCUMENTS

CN 1481086 A 3/2004
CN 101208890 B 3/2012
(Continued)

OTHER PUBLICATIONS

Iris Choi et al., "Field trial of a quantum secured 10Gbis DWDM transmission system over a single installed fiber", Optics Express, vol. 22, Issue 19, Sep. 22, 2014, p. 23121-23128.
(Continued)

*Primary Examiner* — Dzung D Tran
(74) *Attorney, Agent, or Firm* — Womble Bond Dickinson (US) LLP

(57) ABSTRACT

In the embodiments of the present disclosure, a transmit apparatus generates a to-be-processed optical signal and a quantum optical signal, where the to-be-processed optical signal includes at least a classical optical signal; and the transmit apparatus couples the to-be-processed optical signal and the quantum optical signal, to obtain a coupled optical signal, and sends the coupled optical signal. Because a wavelength of the classical optical signal is in an L band and/or a C band and a wavelength of the quantum optical signal is in an S band, a wavelength in the band of the classical optical signal is greater than a wavelength in the band of the quantum optical signal.

12 Claims, 11 Drawing Sheets

(51) Int. Cl.
*H04J 14/02* (2006.01)
*H04B 10/50* (2013.01)

(56) References Cited

U.S. PATENT DOCUMENTS

| | | | |
|---|---|---|---|
| 7,809,268 | B2 | 10/2010 | Meli et al. |
| 8,280,250 | B2* | 10/2012 | Brodsky .............. H04B 10/70 398/33 |
| 8,457,316 | B2 | 6/2013 | Brodsky et al. |
| 8,483,391 | B2 | 7/2013 | Townsend |
| 2005/0174563 | A1 | 8/2005 | Evans et al. |
| 2007/0065154 | A1 | 3/2007 | Luo et al. |
| 2007/0076884 | A1 | 4/2007 | Wellbrock et al. |
| 2010/0074447 | A1 | 3/2010 | Luo et al. |
| 2011/0085666 | A1* | 4/2011 | Hicks .................. H04L 9/0852 380/278 |
| 2012/0063769 | A1 | 3/2012 | Brodsky et al. |
| 2014/0119729 | A1 | 5/2014 | Brodsky et al. |
| 2016/0218867 | A1* | 7/2016 | Nordholt ............ H04L 9/0852 |
| 2016/0234018 | A1* | 8/2016 | Frohlich ............. H04L 9/0852 |
| 2016/0248586 | A1* | 8/2016 | Hughes .............. H04L 9/0852 |

FOREIGN PATENT DOCUMENTS

| | | |
|---|---|---|
| CN | 103929251 A | 7/2014 |
| CN | 203813797 U | 9/2014 |
| CN | 203968127 U | 11/2014 |
| CN | 104486317 A | 4/2015 |
| CN | 105043718 A | 11/2015 |
| CN | 105049195 A | 11/2015 |
| JP | 2005229598 A | 8/2005 |
| JP | 2009509367 A | 3/2009 |
| JP | 2009510927 A | 3/2009 |
| KR | 101262688 | 5/2013 |
| WO | 2004/051892 A1 | 6/2004 |
| WO | 2006087805 A1 | 8/2006 |
| WO | 2015048783 A1 | 4/2015 |

OTHER PUBLICATIONS

P. Eraerds et al., "Quantum key distribution and 1 Gbps data encryption over a single fibre", New Journal of Physics 12 (2010), 16 pages.

"Series G: Transmission Systems and Media, Digital Systems and Networks Digital sections and digital line system—Digital line systems Optical interfaces for equipments and systems relating to the synchronous digital hierarchy", ITU-T G.957, Mar. 2006, 38 pages.

Choi et al., "Quantum key distribution on a 10Gb/s WDM-PON", Optics Express, vol. 18, No. 9., Apr. 2010, XP9139230A, pp. 9600-9612.

R. J. Runser et al.,Demonstration of 1.3 μm Quantum Key Distribution (QKD) Compatibility with 1.5 μm Metropolitan Wavelength Division Multiplexed (WDM) Systems, OFC/NFOEC 2005, U.S., 2005, total 3 pages.

Menghe YE:"Wavelength Assignment and Switching Technology Supporting Co-Fiber-Transmission of Quantum and Classical Signals", From CNKI,Beijing University of Posts and Telecommunications, Nov. 2013. with partial English translation. Total 63 pages.

Li Jianzeng et al. Broadband network technology, China Radio and Television Press , total 2 pages, with English abstract.

* cited by examiner

201 — A transmit apparatus generates a to-be-processed optical signal and a quantum optical signal, where a wavelength of the quantum optical signal is in an S band, the to-be-processed optical signal includes at least a classical optical signal, and the classical optical signal includes at least one classical optical sub-signal; when the classical optical signal includes one classical optical sub-signal, a wavelength of the classical optical sub-signal is in a C band or an L band; and when the classical optical signal includes a plurality of classical optical sub-signals, the plurality of classical optical sub-signals meet any one of the following content: the plurality of classical optical sub-signals include a classical optical sub-signal whose wavelength is in the C band; the plurality of classical optical sub-signals include a classical optical sub-signal whose wavelength is in the L band; or the plurality of classical optical sub-signals include a classical optical sub-signal whose wavelength is in the C band and a classical optical sub-signal whose wavelength is in the L band 202 — The transmit apparatus couples the to-be-processed optical signal and the quantum optical signal, to obtain a coupled optical signal 203 — The transmit apparatus sends the coupled optical signal by using an optical fiber

FIG. 2

A receive apparatus receives, by using an optical fiber, a coupled optical signal sent by a transmit apparatus, where the coupled optical signal includes a to-be-processed optical signal and a quantum optical signal, a wavelength of the quantum optical signal is in an S band, the to-be-processed optical signal includes at least a classical optical signal, and the classical optical signal includes at least one classical optical sub-signal; when the classical optical signal includes one classical optical sub-signal, a wavelength of the classical optical sub-signal is in a C band or an L band; and when the classical optical signal includes a plurality of classical optical sub-signals, the plurality of classical optical sub-signals meet any one of the following content: the plurality of classical optical sub-signals include a classical optical sub-signal whose wavelength is in the C band; the plurality of classical optical sub-signals include a classical optical sub-signal whose wavelength is in the L band; or the plurality of classical optical sub-signals include a classical optical sub-signal whose wavelength is in the C band and a classical optical sub-signal whose wavelength is in the L band — 2001

↓

The receive apparatus determines a classical optical signal and the quantum optical signal based on the coupled optical signal — 2002

FIG. 2a

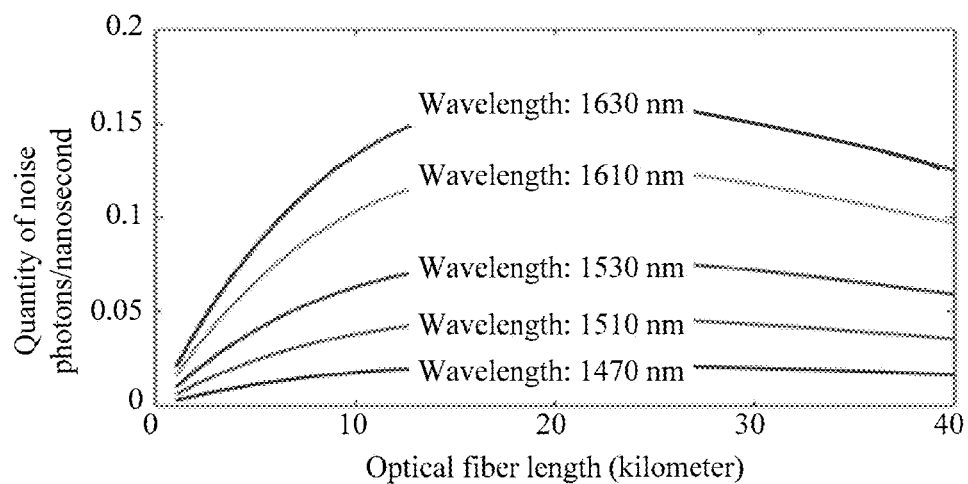

FIG. 2b

QUANTUM COMMUNICATION METHOD AND RELATED APPARATUS

CROSS-REFERENCE TO RELATED APPLICATIONS

This application is a continuation of International Application No. PCT/CN2017/076830 filed on Mar. 15, 2017, which claims priority to Chinese Patent Application No. 201610388547.2 filed on Jun. 2, 2016. The disclosures of the aforementioned applications are hereby incorporated by reference in their entireties.

TECHNICAL FIELD

Embodiments of the present application relate to the field of communications technologies, and in particular, to a quantum communication method and a related apparatus.

BACKGROUND

To effectively resolve an information security problem, a quantum key distribution (QKD) technology emerges and is currently developing towards a market and becoming practical.

In a one-way QKD system, an implementation is as follows: In a transmit apparatus, a group of random numbers are encoded on a quantum state of a quantum optical signal. After being transmitted through a quantum channel, the quantum optical signal is detected by a receiver of a receive apparatus. After implementing a series of processing processes on a classical channel, such as data comparison and negotiation, the transmit apparatus and the receive apparatus finally share a secure key including a group of random numbers. In a typical QKD system, an optical fiber used for communication between a transmit apparatus and a receive apparatus carries only a quantum optical signal. This is favorable to quantum optical signal detection, because there is no impact of additional noise brought by another optical signal in this case. However, quantum communication definitely develops towards networking and globalization in the future. At present, a development process of metropolitan area networks is based on deployment of an optical fiber network. It is impossible to tear down the original optical fiber network and deploy a new quantum network. Therefore, an only way is to perform integration based on the original optical fiber network by using a wavelength division multiplexing (WDM) technology, to obtain a quantum-classical hybrid optical network. In other words, the WDM technology needs to be used to simultaneously transmit a quantum optical signal and a classical optical signal in one optical fiber.

WDM is a technology in which two types of or a plurality of types of optical carrier signals (carrying various types of information) of different wavelengths are aggregated in the transmit apparatus by using a multiplexer, and an aggregated signal is coupled to one optical fiber of an optical line for transmission. In the receive apparatus, optical carrier signals of different wavelengths are separated by using a demultiplexer, and are further processed by an optical receiver to restore the original signals.

In the prior art, there are a plurality of bands that may be used to transmit an optical carrier signal, for example, an L band, a C band, an S band, an E band, and an O band. Wavelength ranges corresponding to all bands are different from each other. A wavelength range of the L band is from 1565 nanometers (nm) to 1625 nm, a wavelength range of the C band is from 1530 nm to 1565 nm, a wavelength range of the S band is from 1460 nm to 1530 nm, a wavelength range of the E band is from 1360 nm to 1460 nm, and a wavelength range of the O band is from 1260 nm to 1360 nm.

A solution that implements hybrid transmission of a classical optical signal and a quantum optical signal in a same optical fiber is to respectively transmit a classical optical signal and a quantum optical signal in the C band and the L band based on the WDM technology. However, in the optical fiber, Raman noise is generated after inelastic scattering occurs between a pump photon and an optical phonon, and a wavelength of a generated scattered photon is less than or greater than that of pump light, and is corresponding to an anti-Strokes scattering region or a Strokes scattering region. In addition, a scattering intensity of the Strokes scattering region is greater than that of the anti-Strokes scattering region. Therefore, when the quantum optical signal is configured to be in the L band corresponding to a relatively large wavelength, the quantum optical signal is mainly affected by the Strokes scattering region. In this case, the quantum optical signal is greatly affected by the Raman noise.

In conclusion, a quantum communication method and a related apparatus are urgently required, to reduce impact of the Raman noise on the quantum optical signal when hybrid transmission of the classical optical signal and the quantum optical signal is performed by using one optical fiber.

SUMMARY

Embodiments of the present disclosure provide a quantum communication method and a related apparatus, to reduce impact of Raman noise on a quantum optical signal when hybrid transmission of a classical optical signal and the quantum optical signal is performed by using one optical fiber.

An embodiment of the present disclosure provides a transmit apparatus for quantum communication, including:

a classical optical signal transmitter, configured to generate a to-be-processed optical signal;

a quantum optical signal transmitter, configured to generate a quantum optical signal, where a wavelength of the quantum optical signal is in an S band;

a first coupling unit, configured to couple the to-be-processed optical signal and the quantum optical signal, to obtain a coupled optical signal; and send the coupled optical signal by using an optical fiber; where the to-be-processed optical signal includes at least a classical optical signal, and the classical optical signal includes at least one classical optical sub-signal; when the classical optical signal includes one classical optical sub-signal, a wavelength of the classical optical sub-signal is in a C band or an L band; and when the classical optical signal includes a plurality of classical optical sub-signals, the plurality of classical optical sub-signals meet any one of the following content: The plurality of classical optical sub-signals include a classical optical sub-signal whose wavelength is in the C band; the plurality of classical optical sub-signals include a classical optical sub-signal whose wavelength is in the L band; or the plurality of classical optical sub-signals include a classical optical sub-signal whose wavelength is in the C band and a classical optical sub-signal whose wavelength is in the L band.

An embodiment of the present disclosure provides a receive apparatus for quantum communication, including:

a second coupling unit, configured to receive, by using an optical fiber, a coupled optical signal sent by a transmit apparatus, and to determine the to-be-processed optical signal and the quantum optical signal from the coupled optical signal, where the coupled optical signal includes a to-be-processed optical signal and a quantum optical signal, and a wavelength of the quantum optical signal is in an S band;

a classical optical signal receiver, configured to: receive the to-be-processed optical signal output by the second coupling unit, and determine a classical optical signal from the to-be-processed optical signal; and a quantum optical signal receiver, configured to receive and process the quantum optical signal output by the second coupling unit; where the to-be-processed optical signal includes at least the classical optical signal, and the classical optical signal includes at least one classical optical sub-signal; when the classical optical signal includes one classical optical sub-signal, a wavelength of the classical optical sub-signal is in a C band or an L band; and when the classical optical signal includes a plurality of classical optical sub-signals, the plurality of classical optical sub-signals meet any one of the following content: The plurality of classical optical sub-signals include a classical optical sub-signal whose wavelength is in the C band; the plurality of classical optical sub-signals include a classical optical sub-signal whose wavelength is in the L band; or the plurality of classical optical sub-signals include a classical optical sub-signal whose wavelength is in the C band and a classical optical sub-signal whose wavelength is in the L band.

An embodiment of the present disclosure provides a quantum communication method, including:

generating, by a transmit apparatus, a to-be-processed optical signal and a quantum optical signal, where a wavelength of the quantum optical signal is in an S band; coupling, by the transmit apparatus, the to-be-processed optical signal and the quantum optical signal, to obtain a coupled optical signal; and sending, by the transmit apparatus, the coupled optical signal by using an optical fiber; where the to-be-processed optical signal includes at least a classical optical signal, and the classical optical signal includes at least one classical optical sub-signal; when the classical optical signal includes one classical optical sub-signal, a wavelength of the classical optical sub-signal is in a C band or an L band; and when the classical optical signal includes a plurality of classical optical sub-signals, the plurality of classical optical sub-signals meet any one of the following content: The plurality of classical optical sub-signals include a classical optical sub-signal whose wavelength is in the C band; the plurality of classical optical sub-signals include a classical optical sub-signal whose wavelength is in the L band; or the plurality of classical optical sub-signals include a classical optical sub-signal whose wavelength is in the C band and a classical optical sub-signal whose wavelength is in the L band.

An embodiment of the present disclosure provides a quantum communication method, including:

receiving, by a receive apparatus by using an optical fiber, a coupled optical signal sent by a transmit apparatus, where the coupled optical signal includes a to-be-processed optical signal and a quantum optical signal, and a wavelength of the quantum optical signal is in an S band; and determining, by the receive apparatus, a classical optical signal and the quantum optical signal based on the coupled optical signal; where the to-be-processed optical signal includes at least the classical optical signal, and the classical optical signal includes at least one classical optical sub-signal; when the classical optical signal includes one classical optical sub-signal, a wavelength of the classical optical sub-signal is in a C band or an L band; and when the classical optical signal includes a plurality of classical optical sub-signals, the plurality of classical optical sub-signals meet any one of the following content: The plurality of classical optical sub-signals include a classical optical sub-signal whose wavelength is in the C band; the plurality of classical optical sub-signals include a classical optical sub-signal whose wavelength is in the L band; or the plurality of classical optical sub-signals include a classical optical sub-signal whose wavelength is in the C band and a classical optical sub-signal whose wavelength is in the L band.

BRIEF DESCRIPTION OF THE DRAWINGS

To describe the technical solutions in the embodiments of the present disclosure more clearly, the following briefly describes the accompanying drawings required for describing the embodiments.

FIG. 2 is a schematic flowchart of a quantum communication method according to an embodiment of the present disclosure;

FIG. 2a is a schematic flowchart of another quantum communication method according to an embodiment of the present disclosure;

FIG. 2b is a schematic diagram of a correspondence, between an optical fiber length and a quantity of noise photons, existing when a wavelength of a quantum optical signal varies;

DETAILED DESCRIPTION

To make the objectives, technical solutions, and advantages of the present disclosure clearer and more comprehensible, the following further describes the present disclosure in detail with reference to the accompanying drawings and embodiments. It should be understood that the specific embodiments described herein are merely used to explain the present disclosure but are not intended to limit the present disclosure.

Figure 1:
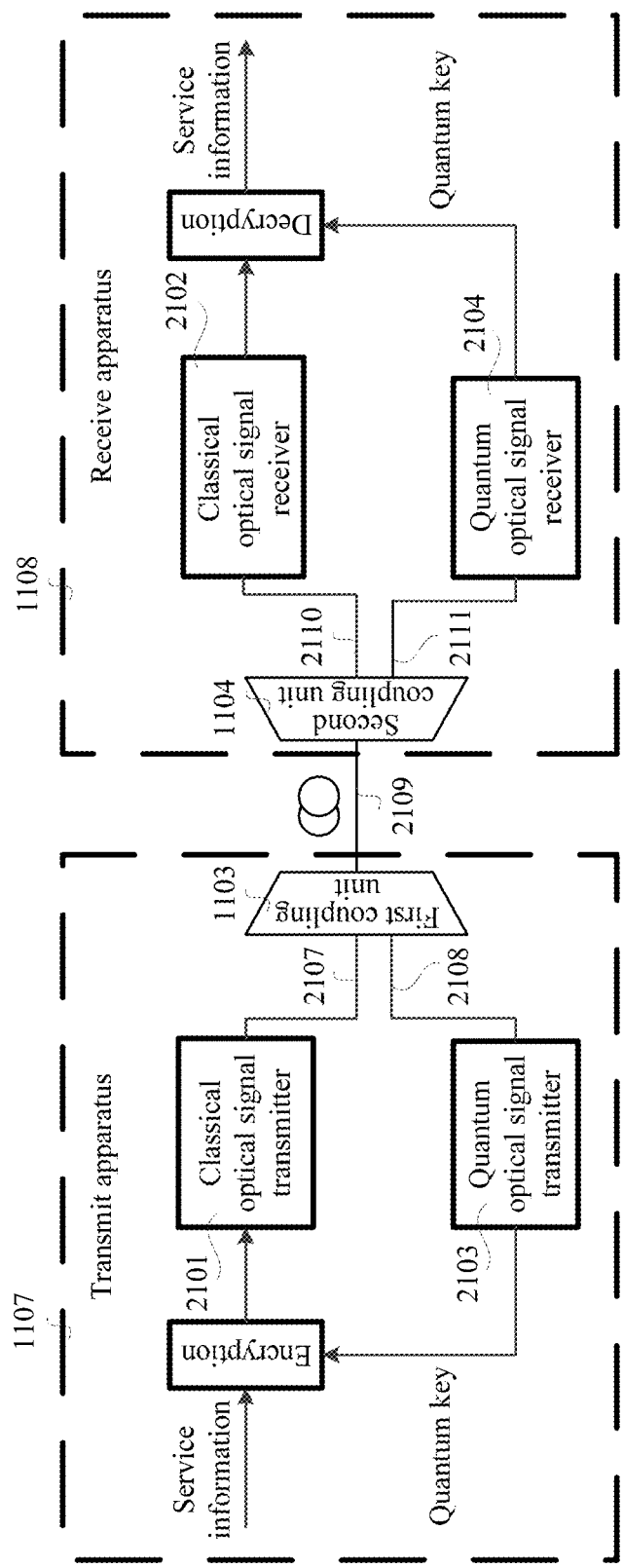
FIG. 1 is a schematic diagram of a system architecture applicable to an embodiment of the present disclosure.

FIG. 1 shows an example of a schematic diagram of a system architecture applicable to an embodiment of the present disclosure. As shown in FIG. 1, the system architecture applicable to this embodiment of the present disclosure includes a transmit apparatus 1107 and a receive apparatus 1108. The transmit apparatus 1107 and the receive apparatus 1108 in this embodiment of the present disclosure may be located in two network devices or two user equipments. Alternatively, the transmit apparatus 1107 is located in a network device, and the receive apparatus 1108 is located in user equipment. Alternatively, the transmit apparatus is located in user equipment, and the receive apparatus is located in a network device. Optionally, to make a network device have both a sending function and a receiving function, one transmit apparatus 1107 and one receive apparatus 1108 are usually deployed in the network device. In a network device on the other side, one transmit apparatus 1107 and one receive apparatus 1108 are also deployed. The transmit apparatus 1107 in the network device on the one side and the receive apparatus 1108 in the network device on the other side are a pair of transmit apparatus 1107 and receive apparatus 1108 in this embodiment of the present disclosure. The receive apparatus 1108 in the network device on the one side and the transmit apparatus 1107 in the network device on the other side are another pair of transmit apparatus 1107 and receive apparatus 1108 in this embodiment of the present disclosure.

The user equipment may communicate with one or more core networks through a radio access network (RAN). A terminal device may be the user equipment (UE), an access terminal, a user unit, a subscriber station, a mobile station, a remote station, a remote terminal, a mobile device, a user terminal, a terminal, radio communications equipment, a user agent, or a user apparatus. The access terminal may be a cell phone, a cordless phone, a Session Initiation Protocol (SIP) phone, a wireless local loop (WLL) station, a personal digital assistant (PDA), a handheld device having a wireless communication function, a computing device or another processing device that is connected to a wireless modem, an in-vehicle device, a wearable device, a terminal device in a future 5G network, or the like.

The network device may be a device that is configured to communicate with the terminal device, for example, may be a base transceiver station (BTS) in a GSM or CDMA system, a NodeB (NB) in a WCDMA system, or an evolved NodeB (eNB or eNodeB) in an LTE system. Alternatively, the network device may be a relay node, an access point, an in-vehicle device, a wearable device, a network-side device in the future 5G network, a network device in a future evolved PLMN network, or the like.

In this embodiment of the present disclosure, a classical optical signal transmitter 2101 included in the transmit apparatus 1107 is configured to generate a classical optical signal, and a quantum optical signal transmitter 2103 included in the transmit apparatus 1107 is configured to generate a quantum optical signal. The transmit apparatus 1107 couples the classical optical signal and the quantum optical signal by using a first coupling unit 1103, to obtain a coupled optical signal. The transmit apparatus 1107 sends the coupled optical signal by using an optical fiber.

The receive apparatus 1108 receives the coupled optical signal by using the optical fiber. Then, through decoupling processing by a second coupling unit 1104, the receive apparatus 1108 separates the classical optical signal in the coupled optical signal to a classical optical signal receiver 2102, separates the quantum optical signal in the coupled optical signal to a quantum optical signal receiver 2104, and performs corresponding processing on the classical optical signal and the quantum optical signal.

The transmit apparatus 1107 sends the classical optical signal and the quantum optical signal, and determines a quantum key from the quantum optical signal generated by the quantum optical signal transmitter 2103. The transmit apparatus 1107 uses the quantum key to encrypt service information, further processes encrypted service information by using the classical optical signal transmitter 2101, and couples, to the optical fiber for transmission, the encrypted service information and a next quantum optical signal sent by the quantum optical signal transmitter 2103. After receiving a coupled optical signal, the receive apparatus 1108 separates the classical optical signal in the coupled optical signal to the classical optical signal receiver 2102, separates the quantum optical signal in the coupled optical signal to the quantum optical signal receiver 2104. The receive apparatus 1108 determines the quantum key from the quantum optical signal received by the quantum optical signal receiver 2104, and uses the quantum key to decrypt the processed encrypted information in the classical optical signal received by the classical optical signal receiver 2102, to restore the service information.

Figure 1A:
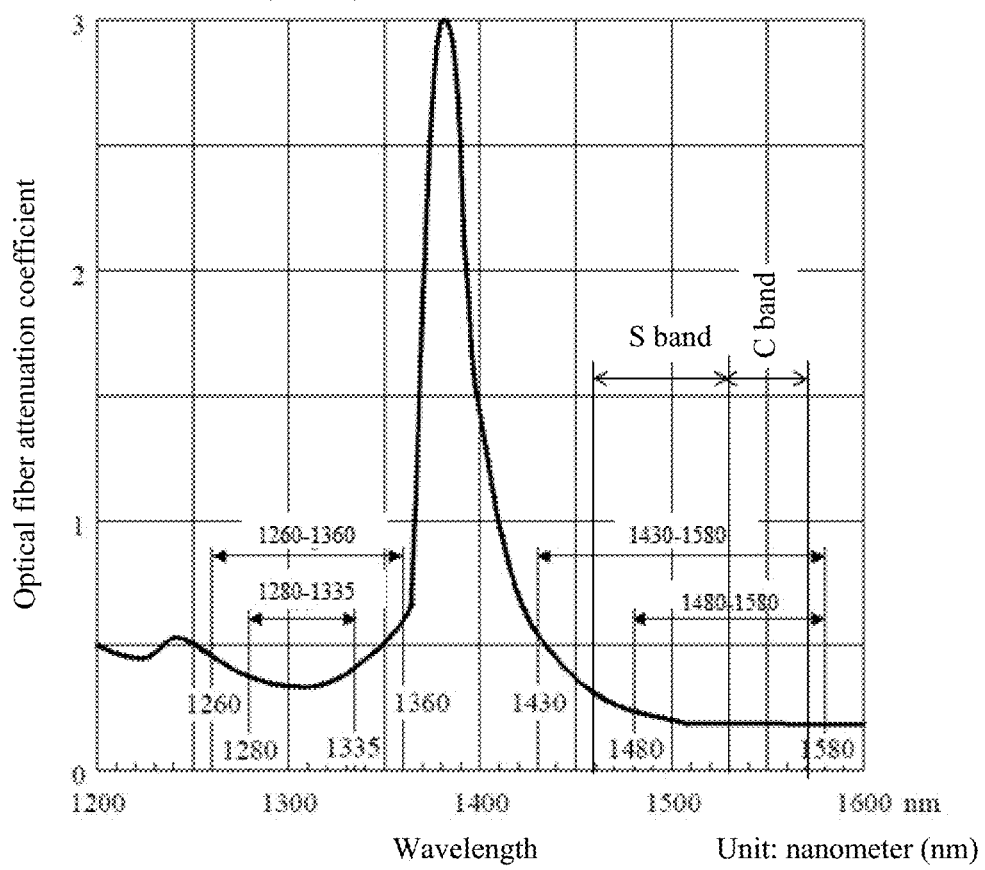
FIG. 1a shows an example of a schematic diagram of attenuation coefficients corresponding to various bands according to an embodiment of the present disclosure.

FIG. 1a shows an example of a schematic diagram of attenuation coefficients corresponding to various bands according to an embodiment of the present disclosure. As shown in FIG. 1a, a horizontal coordinate represents a wavelength, measured in nm; and a vertical coordinate represents an optical fiber attenuation coefficient, measured in decibels per kilometer (dB/km). Wavelength ranges corresponding to all bands are different from each other. A wavelength range of an L band is from 1565 nm to 1625 nm, a wavelength range of a C band is from 1530 nm to 1565 nm, a wavelength range of an S band is from 1460 nm to 1530 nm, a wavelength range of an E band is from 1360 nm to 1460 nm, and a wavelength range of an O band is from 1260 nm to 1360 nm. As shown in FIG. 1a, optical fiber attenuation coefficients of the S band, the C band, and the E band are less than optical fiber attenuation coefficients of other bands. Therefore, there are relatively low losses during optical signal transmission in the S band, the C band, and the E band.

Based on the foregoing content, an embodiment of the present disclosure provides a quantum communication scheme, to achieve an objective of transmitting a classical optical signal and a quantum optical signal in one optical fiber.

FIG. 2 shows an example of a schematic flowchart of a quantum communication method according to an embodiment of the present disclosure.

Based on the system architecture shown in FIG. 1, as shown in FIG. 2, a quantum communication method implemented on the transmit apparatus 1107 side provided in this embodiment of the present disclosure includes the following steps:

Step 201. The transmit apparatus generates a to-be-processed optical signal and a quantum optical signal, where a wavelength of the quantum optical signal is in an S band.

Step 202. The transmit apparatus couples the to-be-processed optical signal and the quantum optical signal, to obtain a coupled optical signal.

Step 203. The transmit apparatus sends the coupled optical signal by using an optical fiber.

The to-be-processed optical signal includes at least a classical optical signal, and the classical optical signal includes at least one classical optical sub-signal. When the classical optical signal includes one classical optical sub-signal, a wavelength of the classical optical sub-signal is in a C band or an L band. When the classical optical signal includes a plurality of classical optical sub-signals, the plurality of classical optical sub-signals meet any one of the following content: The plurality of classical optical sub-signals include a classical optical sub-signal whose wavelength is in the C band; the plurality of classical optical sub-signals include a classical optical sub-signal whose wavelength is in the L band; or the plurality of classical optical sub-signals include a classical optical sub-signal whose wavelength is in the C band and a classical optical sub-signal whose wavelength is in the L band.

Optionally, when the classical optical signal includes one classical optical sub-signal, the classical optical sub-signal is the classical optical signal; when the classical optical signal includes a plurality of classical optical sub-signals, the plurality of classical optical sub-signals may be multiplexed or coupled to obtain the classical optical signal.

It can be learned that, because a wavelength of the classical optical signal is in the L band and/or the C band and the wavelength of the quantum optical signal is in the S band, a wavelength in the band of the classical optical signal is greater than a wavelength in the band of the quantum optical signal. Therefore, the quantum optical signal may be in an anti-Stokes scattering region. In addition, a scattering intensity of the anti-Stokes scattering region is relatively low, and therefore, impact of Raman noise on the quantum optical signal can be effectively reduced, and quality of the quantum optical signal is improved when hybrid transmission of the classical optical signal and the quantum optical signal is performed by using one optical fiber.

Further, because the wavelength of the quantum optical signal is in the S band, and an optical fiber attenuation coefficient of the S band is relatively small, when the quantum optical signal is transmitted in the S band with a relatively low insertion loss, a loss of the quantum optical signal can be reduced, and a secure distance of quantum key transmission is increased.

Further, the wavelength of the classical optical signal is in the L band and/or the C band, while the wavelength of the quantum optical signal is in the S band; in other words, the band of the classical optical signal and the band of the quantum optical signal are two different bands, ensuring a distance between the wavelength of the classical optical signal and the wavelength of the quantum optical signal. In this way, interference caused to the quantum optical signal due to leakage of the classical optical signal can be effectively reduced, and interference caused to the quantum optical signal due to FWM generated during transmission of the classical optical signal can be effectively reduced.

Optionally, FIG. 2a shows an example of a schematic flowchart of another quantum communication method according to an embodiment of the present disclosure. As shown in FIG. 2a, a quantum communication method implemented on the receive apparatus 1108 side provided in this embodiment of the present disclosure includes the following steps:

Step 2001. The receive apparatus receives, by using an optical fiber, a coupled optical signal sent by the transmit apparatus, where the coupled optical signal includes a to-be-processed optical signal and a quantum optical signal, and a wavelength of the quantum optical signal is in an S band.

Step 2002. The receive apparatus determines a classical optical signal and the quantum optical signal based on the coupled optical signal.

The to-be-processed optical signal includes at least the classical optical signal, and the classical optical signal includes at least one classical optical sub-signal. When the classical optical signal includes one classical optical sub-signal, a wavelength of the classical optical sub-signal is in a C band or an L band. When the classical optical signal includes a plurality of classical optical sub-signals, the plurality of classical optical sub-signals meet any one of the following content: The plurality of classical optical sub-signals include a classical optical sub-signal whose wavelength is in the C band; the plurality of classical optical sub-signals include a classical optical sub-signal whose wavelength is in the L band; or the plurality of classical optical sub-signals include a classical optical sub-signal whose wavelength is in the C band and a classical optical sub-signal whose wavelength is in the L band.

Optionally, when the classical optical signal includes one classical optical sub-signal, the classical optical sub-signal is the classical optical signal; when the classical optical signal includes a plurality of classical optical sub-signals, the plurality of classical optical sub-signals may be multiplexed or coupled to obtain the classical optical signal.

With reference to FIG. 1a, the wavelength of the quantum optical signal is in the S band, and the S band is a band with a relatively small optical fiber attenuation coefficient. To be specific, compared with transmission of the quantum optical signal in an O band in the prior art, there is a lower loss in transmission of the quantum optical signal in the S band because the optical fiber attenuation coefficient of the S band is less than an optical fiber attenuation coefficient of the O band. It can be learned that, the quantum optical signal is transmitted in the S band, so that an insertion loss of the quantum optical signal is reduced, and a secure distance of quantum key transmission is increased.

During specific implementation, in the optical fiber, spontaneous Raman scattering SRS noise is generated after inelastic scattering occurs between a pump photon and an optical phonon. The inelastic scattering includes Stokes scattering and anti-Stokes scattering. A gain range reaches 30 THz. A gain peak frequency offset is approximately 13.2 THz, and increases exponentially with an increase of an optical power. An intensity of the anti-Stokes scattering is generally lower than that of the Stokes scattering.

Assuming that the solution in this embodiment of the present disclosure is not used, but instead, the wavelength of the quantum optical signal is set to greater than a wavelength of the classical optical signal, the wavelength of the quantum optical signal is in a Stokes scattering region of the classical optical signal. The following analysis is performed by using an example in which the classical optical signal is in the C band and the quantum optical signal is in the L band:

When a power of the classical optical signal is $P_0$, an intensity of Raman noise caused by the classical optical signal may be represented by using Formula (1):

$$S(L) = \begin{cases} P_0 \beta_s L e^{-\alpha_P L} & \ldots (\alpha_P = \alpha_s) \\ P_0 \dfrac{\beta_s}{\alpha_s - \alpha_P}(e^{-\alpha_P L} - e^{-\alpha_s L}) & \ldots (\alpha_P \neq \alpha_s) \end{cases} \quad \text{Formula (1)}$$

In Formula (1), S(L) indicates the intensity of the Raman noise caused by the classical optical signal when the power of the classical optical signal is $P_0$;

$P_0$ indicates the power of the classical optical signal;

$\alpha_P$ indicates an optical fiber attenuation coefficient of the classical optical signal, and $\alpha_s$ indicates an optical fiber attenuation coefficient of the quantum optical signal;

$\beta_s$ indicates a spontaneous Raman coefficient corresponding to the quantum optical signal; and L indicates a transmission distance.

When there are a plurality of classical channels in a system, an intensity of Raman noise caused by the plurality of classical channels may be represented by using Formula (2):

$$S(L) = \begin{cases} Le^{-\alpha_P L} \sum_i P_{oi} \beta_{si} & \ldots (\overline{\alpha}_P = \alpha_s) \\ \dfrac{\sum_i P_{oi} \beta_{si}}{\alpha_s - \overline{\alpha}_P} (e^{-\overline{\alpha}_P L} - e^{-\alpha_s L}) & \ldots (\overline{\alpha}_P \neq \alpha_s) \end{cases} \quad \text{Formula (2)}$$

In Formula (2):

S(L) indicates the intensity of the Raman noise caused by the plurality of classical channels;

$P_{oi}$ indicates an optical power corresponding to an $i^{th}$ classical optical signal, where a value range of i is [1, a total quantity of classical optical signals];

$\overline{\alpha}_P$ indicates an average optical fiber attenuation coefficient of all the classical optical signals, and $\alpha_s$ indicates the optical fiber attenuation coefficient of the quantum optical signal;

$\beta_{si}$ indicates a spontaneous Raman coefficient, corresponding to the $i^{th}$ classical optical signal, of the quantum optical signal; and L indicates the transmission distance.

In Formula (2), a plurality of classical optical signals are considered, and an attenuation coefficient of each classical optical signal varies, and therefore, $\overline{\alpha}_P$ is used to represent the average optical fiber attenuation coefficient.

In general, analysis is performed below based on a case in which there is only one classical optical signal:

If a wavelength bandwidth of a detector is $\Delta\lambda$, the corresponding Raman noise intensity is represented by using Formula (3):

$$P_{SRS} = S(L) \times \Delta\lambda \quad \text{Formula (3)}$$

In Formula (3), $P_{SRS}$ indicates the corresponding Raman noise intensity obtained when the wavelength bandwidth of the detector is $\Delta\lambda$; and S(L) indicates the intensity of the Raman noise caused by the classical optical signal when the power of the classical optical signal in Formula (1) is $P_0$.

Before an average quantity of photons in modes per unit time and per unit space is estimated, a total quantity of modes in the wavelength bandwidth $\Delta\lambda$ and in a time window $\Delta t = 1$ s needs to be determined first. Based on a relationship between a frequency and a wavelength, Formula (4) can be obtained:

$$N_{mod} = |\Delta v \times \Delta t| = \frac{c}{\lambda^2} \Delta\lambda \quad \text{Formula (4)}$$

In Formula (4), $N_{mod}$ indicates the total quantity of modes within the bandwidth $\Delta\lambda$ and in the time window $\Delta t = 1$ s;

$\lambda$ indicates the wavelength of the quantum optical signal, c indicates a speed of light, and v indicates a frequency of the quantum optical signal, where $v = c/\lambda$; and $\Delta t$ indicates the time window, $\Delta\lambda$ indicates the wavelength bandwidth, and $\Delta v$ indicates a frequency bandwidth.

Therefore, an average quantity of noise photons in modes per unit time, per unit space, and per unit polarization is represented by using Formula (5):

$$<N_{SRS}> = \frac{P_{SRS}}{h v N_{mod}} \eta_D \quad \text{Formula (5)}$$

In Formula (5):

$<N_{SRS}>$ indicates the average quantity of noise photons in modes per unit time, per unit space, and per unit polarization;

$P_{SRS}$ indicates the corresponding Raman noise intensity obtained when the wavelength bandwidth of the detector in Formula (3) is $\Delta\lambda$;

$N_{mod}$ indicates the total quantity of modes in the wavelength bandwidth $\Delta\lambda$ and in the time window $\Delta t = 1$ s in Formula (4);

v indicates the frequency of the quantum optical signal;

h indicates a Planck constant; and $\eta_D$ indicates a transmission coefficient of a demultiplexer (DEMUX).

After the parameters in Formula (1) to Formula (4) are substituted into Formula (5), Formula (5) may be converted to the following Formula (6):

$$<N_{SRS}> = \begin{cases} \dfrac{1}{2}\left[\dfrac{\lambda^3}{hc^2} \beta_s \eta_D \; P_0 L e^{-\alpha_P L}\right] & \ldots (\alpha_P = \alpha_s) \\ \dfrac{1}{2}\left[\dfrac{\lambda^3}{hc^2} \eta_D \dfrac{\beta_s}{\alpha_s - \alpha_P}(e^{-\alpha_P L} - e^{-\alpha_s L})\right] P_0 & \ldots (\alpha_P \neq \alpha_s) \end{cases} \quad \text{Formula (6)}$$

In Formula (6):

$<N_{SRS}>$ indicates the average quantity of noise photons in modes per unit time, per unit space, and per unit polarization;

$P_0$ indicates the power of the classical optical signal;

$\alpha_P$ indicates the optical fiber attenuation coefficient of the classical optical signal, and $\alpha_s$ indicates the optical fiber attenuation coefficient of the quantum optical signal;

$\beta_s$ indicates the spontaneous Raman coefficient corresponding to the quantum optical signal;

L indicates the transmission distance;

$\lambda$ indicates the wavelength of the quantum optical signal, and c indicates the speed of light;

h indicates the Planck constant; and $\eta_D$ indicates the transmission coefficient of the demultiplexer (DEMUX).

Based on the foregoing formula derivation, and assuming that the wavelength of the classical optical signal is set to 1550 nm in the C band, the power of the classical optical signal is 0 dBm, a gate width of the detector is 1 ns, a filtering bandwidth is 75 GHz, and an insertion loss of the demultiplexer (DEMUX) is 1.5 dB, FIG. 2b shows an example of a schematic diagram of a correspondence, between an optical fiber length and a quantity of noise photons, existing when a wavelength of a quantum optical signal varies. As shown in FIG. 2b, a horizontal axis indicates the optical fiber length, measured in kilometers, and a vertical axis indicates a quantity of noise photons per nanosecond (represented as Quantity of noise photons/

Nanosecond in the figure). It can be learned that, because a wavelength range of the L band is from 1565 nm to 1625 nm and a wavelength range of the S band is from 1460 nm to 1530 nm, if the optical fiber length is fixed, an average quantity of Raman noise photons generated per nanometer in the L band is greater than that in the S band. For example, a quantity of noise photons corresponding to a wavelength of 1470 nm is only approximately one tenth of that corresponding to a wavelength of 1630 nm. In other words, in an actual system, when the classical optical signal belongs to the C band, if the quantum optical signal operates in the L band, the quantum optical signal is affected by an excessively large quantity of Raman noise photons. In this case, a rate of successfully sending a quantum key and a secure distance of quantum key transmission are reduced. Therefore, it is not suitable for the quantum optical signal to operate in the L band.

As shown in FIG. 2b, if the optical fiber length is fixed, a greater wavelength of the quantum optical signal indicates a larger quantity of noise photons corresponding to the quantum optical signal. Therefore, in this embodiment of the present disclosure, the quantum optical signal is transmitted in the S band. When the classical optical signal includes one classical optical sub-signal, the wavelength of the classical optical sub-signal is in the C band or the L band. When the classical optical signal includes a plurality of classical optical sub-signals, the plurality of classical optical sub-signals meet any one of the following content:

The plurality of classical optical sub-signals include a classical optical sub-signal whose wavelength is in the C band; the plurality of classical optical sub-signals include a classical optical sub-signal whose wavelength is in the L band; or the plurality of classical optical sub-signals include a classical optical sub-signal whose wavelength is in the C band and a classical optical sub-signal whose wavelength is in the L band. Optionally, when the classical optical signal includes one classical optical sub-signal, the classical optical sub-signal is the classical optical signal; when the classical optical signal includes a plurality of classical optical sub-signals, the plurality of classical optical sub-signals may be multiplexed or coupled to obtain the classical optical signal. In other words, the wavelength of the classical optical sub-signal included in the classical optical signal is within a wavelength range of the C band, from 1530 nm to 1565 nm; the wavelength of the classical optical sub-signal included in the classical optical signal is within the wavelength range of the L band, from 1565 nm to 1625 nm; or the wavelength of the classical optical sub-signal included in the classical optical signal is within a wavelength range of the L band and the C band, from 1530 nm to 1625 nm.

In this case, the wavelength of the classical optical signal may be greater than the wavelength of the quantum optical signal, so that the quantum optical signal is in the anti-Strokes scattering region, thereby reducing the quantity of Raman noise photons corresponding to the wavelength of the quantum optical signal. To be specific, compared with a solution in which the quantum optical signal is configured to be in the L band, in this embodiment of the present disclosure, when the wavelength of the quantum optical signal is in the S band, the quantity of Raman noise photons affecting the quantum optical signal decreases nearly tenfold. In other words, compared with the solution in which a band of the quantum optical signal is set to the L band, in this embodiment of the present disclosure, the wavelength of the classical optical signal is in the C band, the wavelength of the quantum optical signal is in the S band, and a capability of the quantum optical signal in resisting the Raman noise in the C band increases tenfold, thereby reducing a bit error rate of the system, and further improving the rate of successfully sending the quantum key. Optionally, during selection of the wavelength for the quantum optical signal, gain peak frequency offsets (for example, 13.2 THz) of the Strokes scattering and the anti-Strokes scattering need to be avoided.

Further, the wavelength (for example, 1470 nm) of the quantum optical signal is in the S band, is relatively far away from wavelengths of the C band and the L band that are used by the classical optical signal. In other words, the band of the quantum optical signal and the band of the classical optical signal are different bands, thereby elegantly preventing the quantum optical signal from being affected by FWM and amplified spontaneous emission (ASE) noise, reducing the bit error rate of the system, and further improving the rate of successfully sending the quantum key.

It can be learned through the foregoing analysis that, in this embodiment of the present disclosure, during implementation of hybrid transmission of the classical optical signal and the quantum optical signal in the same optical fiber, reduction of the loss of the quantum optical signal is considered, impact, on the quantum optical signal, of the noise photon caused by the classical optical signal is also reduced, and the secure distance of quantum key transmission is further increased.

Figure 2C:
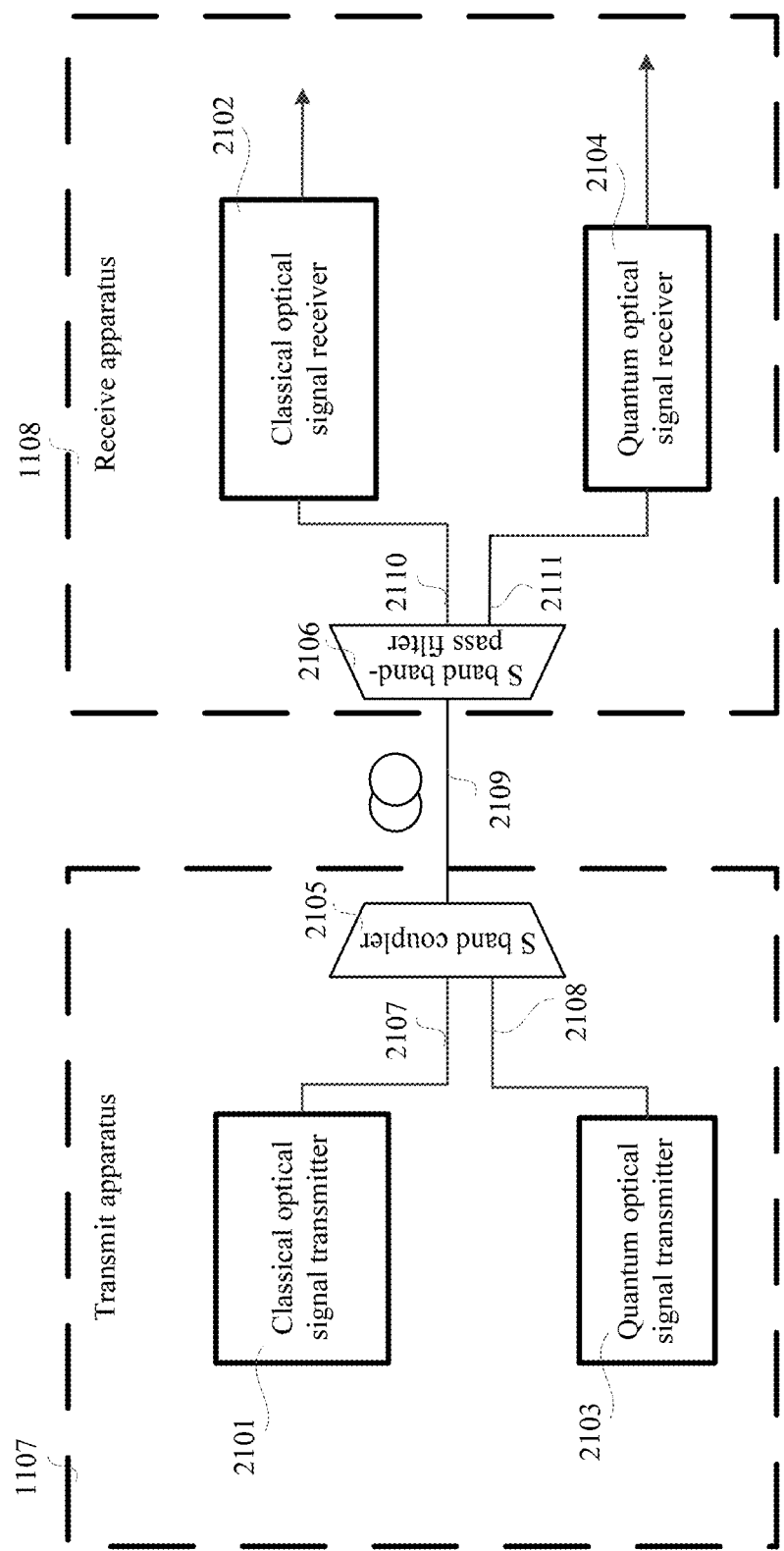
FIG. 2c is a schematic structural diagram of a quantum communications system according to an embodiment of the present disclosure.

FIG. 2c shows an example of a schematic structural diagram of a quantum communications system according to an embodiment of the present disclosure. As shown in FIG. 2c, a transmit apparatus 1107 includes an S band coupler 2105, and a receive apparatus 1108 includes an S band band-pass filter 2106. The S band coupler 2105 may be the first coupling unit 1103 in FIG. 1. The S band band-pass filter 2106 may be the second coupling unit 1104 in FIG. 1.

Optionally, as shown in FIG. 2c, that the transmit apparatus 1107 couples a to-be-processed optical signal and a quantum optical signal to obtain a coupled optical signal includes:

the transmit apparatus 1107 couples, by using the S band coupler 2105 on an optical fiber 2109, the to-be-processed optical signal transmitted in a first sub optical fiber 2107 in the optical fiber 2109 and the quantum optical signal transmitted in a second sub optical fiber 2108 in the optical fiber 2109, to obtain the coupled optical signal.

In this embodiment of the present disclosure, the S band coupler 2105 may couple the to-be-processed optical signal transmitted in the first sub optical fiber 2107 and the S band quantum optical signal transmitted in the second sub optical fiber 2108 in the optical fiber 2109, thereby achieving an objective of transmitting a classical optical signal and the S band quantum optical signal by using one optical fiber. The S band coupler may be an optical fiber coupler, or a wavelength division multiplexer of the S band quantum optical signal and the to-be-processed optical signal.

During specific implementation, a nature of reducing impact of a noise photon on the quantum optical signal is reducing a quantity of noise photons that are finally leaked to a quantum optical signal detector. Therefore, the S band band-pass filter 2106 may be used to effectively filter noise photons surrounding the band of the quantum optical signal, thereby reducing the quantity of noise photons that finally reach the quantum optical signal detector. Optionally, as shown in FIG. 2c, that the receive apparatus 1108 determines a classical optical signal and the quantum optical signal from the coupled optical signal includes:

the receive apparatus 1108 separates the quantum optical signal in the coupled optical signal to a fourth sub optical fiber 2111 in the optical fiber 2109 by using the S band band-pass filter 2106 on the optical fiber 2109; separates, by using the S band band-pass filter 2106 on the optical fiber 2109, the to-be-processed optical signal in the coupled optical signal to a third sub optical fiber 2110 in the optical fiber 2109 for processing; and determines the classical optical signal from the to-be-processed optical signal.

In this embodiment of the present disclosure, the S band band-pass filter 2106 may separate the quantum optical signal in the coupled optical signal to the fourth sub optical fiber 2111 in the optical fiber 2109, and separate the to-be-processed optical signal in the coupled optical signal to the third sub optical fiber 2110 in the optical fiber 2109 for processing, thereby achieving an objective of transmitting the classical optical signal and the quantum optical signal by using one optical fiber and separately processing the classical optical signal and the quantum optical signal. In addition, in this embodiment of the present disclosure, the quantum optical signal may be first filtered by using the S band band-pass filter 2106, to reduce impact of the noise photon.

During specific implementation, when the S band band-pass filter 2106 is used to separate the S band quantum optical signal output by a quantum optical signal transmitter 2103 and the classical optical signal, a filtering bandwidth of the S band band-pass filter 2106 and stability of a laser that outputs the quantum optical signal need to be balanced. Because of impact of various uncertainties, such as a temperature change, an atmospheric change, mechanical vibration, or a magnetic field change, actually, a laser frequency of the quantum optical signal is obviously drifted. If the S band band-pass filter 2106 in this embodiment of the present disclosure is not used, but an ultra-narrowband band-pass filter is used, a center wavelength of the quantum optical signal may easily drift out of a filtering range of the ultra-narrowband band-pass filter. Consequently, the ultra-narrowband band-pass filter also filters the quantum optical signal, leading to a failure to transmit the quantum optical signal. In addition, the ultra-narrowband band-pass filter has a relatively high loss. However, on the other hand, if a bandwidth of the S band band-pass filter 2106 is relatively large, more noise photons are leaked to the quantum optical signal detector, thereby affecting a final key rate of a final quantum key.

Optionally, if the quantum optical signal has only one wavelength, the bandwidth of the S band band-pass filter 2106 is from 0.1 nm to 5 nm. In actual application, the bandwidth of the S band band-pass filter 2106 may be 0.6 nm. Optionally, if there are a plurality of quantum optical sub-signals, the bandwidth of the S band band-pass filter 2106 needs to cover wavelengths of the plurality of quantum optical sub-signals, or needs to cover a wavelength range of an entire S band. Optionally, a bandwidth range of the S band band-pass filter 2106 is from 0.1 nm to 70 nm.

In this case, factors such as system stability, a filtering range and an insertion loss of the S band band-pass filter 2106 may be considered. The bandwidth of the S band band-pass filter 2106 configured in this embodiment of the present disclosure can ensure that the center wavelength of the laser does not easily drift out of the filtering range of the S band band-pass filter 2106, thereby ensuring the stability of the communications system. In addition, the S band band-pass filter 2106 has a relatively low loss, thereby increasing a secure distance of quantum communication. Third, the bandwidth of the S band band-pass filter 2106 is relatively small, and therefore, not many noise photons are leaked to the quantum optical signal detector, thereby improving the final key rate of the quantum key.

Further, because the classical optical signal and the quantum optical signal belong to in different bands, and are relatively far away from each other, it is not required that the S band band-pass filter 2106 have quite high performance to achieve an objective of filtering the noise photon caused by the classical optical signal to the quantum optical signal, thereby reducing costs of the quantum communications system.

Figure 2D:
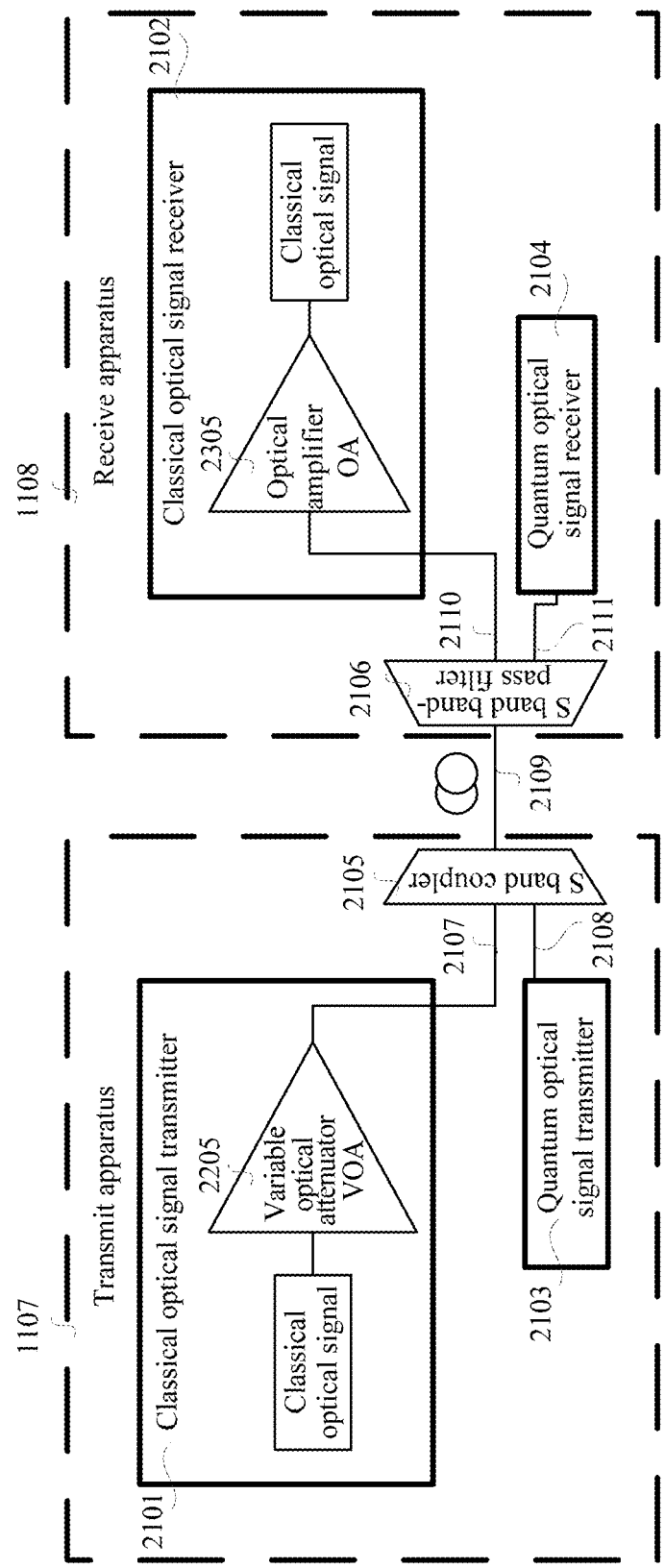
FIG. 2d is a schematic structural diagram of another quantum communications system according to an embodiment of the present disclosure.

FIG. 2d shows an example of a schematic structural diagram of another quantum communications system according to an embodiment of the present disclosure. As shown in FIG. 2d, optionally, that a transmit apparatus 1107 generates a to-be-processed optical signal includes: The transmit apparatus 1107 generates a classical optical signal, and attenuates the generated classical optical signal by using a VOA 2205, to obtain the to-be-processed optical signal.

On a transmit apparatus 1107 side, the VOA 2205 is used to attenuate the classical optical signal without using an EDFA commonly used in the prior art. In this way, impact, on a QKD channel, of ASE noise caused by the EDFA is eliminated. In addition, optical fiber transmission has a relatively low loss, and therefore, there is a relatively low requirement on an optical power of the classical optical signal in a metropolitan area network communications system. In this case, using the VOA 2205 to attenuate the classical optical signal can absolutely make the power of the classical optical signal meet a transmission requirement.

Optionally, that a receive apparatus 1108 determines the classical optical signal from the to-be-processed optical signal includes: The receive apparatus 1108 amplifies the to-be-processed optical signal by using an OA 2305, to obtain the classical optical signal. Specifically, after separating the classical optical signal from a quantum optical signal, the receive apparatus 1108 amplifies the classical optical signal by using the OA without affecting the quantum optical signal. In addition, because the classical optical signal has a loss after being transmitted by using an optical fiber, the classical optical signal is processed after being amplified by using the OA, improving accuracy in processing the classical optical signal.

Figure 2E:
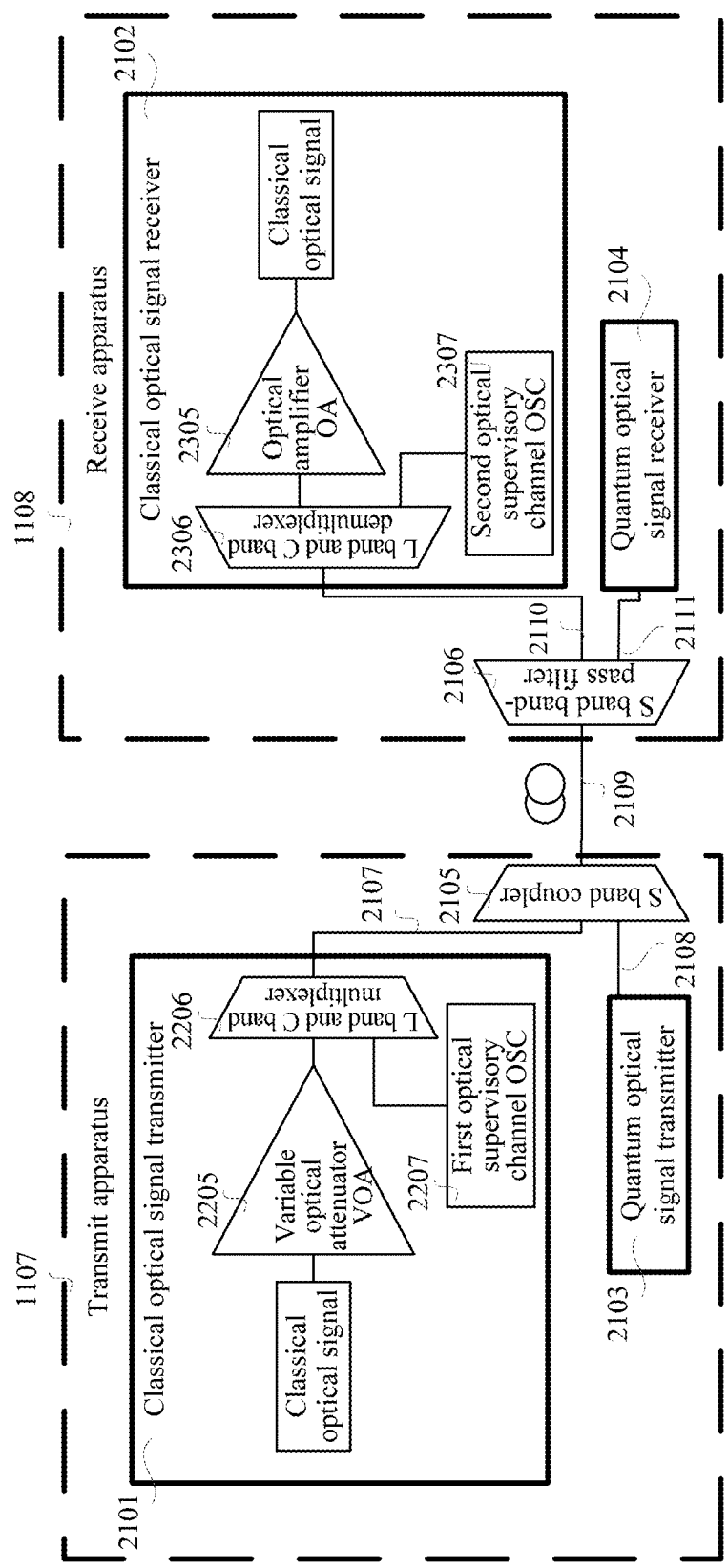
FIG. 2e is a schematic structural diagram of another quantum communications system according to an embodiment of the present disclosure.

FIG. 2e shows an example of a schematic structural diagram of another quantum communications system according to an embodiment of the present disclosure. As shown in FIG. 2e, a classical optical signal transmitter 2101 couples, by using an L band and C band multiplexer 2206, a classical optical signal and a supervisory optical signal that is generated by a first optical supervisory channel 2207 to a first sub optical fiber 2107 for transmission. Optionally, a demultiplexer and the multiplexer in this embodiment of the present disclosure are based on a wavelength division multiplexing system. In other words, a quantum optical signal transmitter 2103 is added to a prior-art WDM system (primary channel+supervisory channel) in this embodiment of the present disclosure. Optionally, as shown in FIG. 2e, on a transmit apparatus 1107 side, a to-be-processed optical signal further includes the supervisory optical signal, and the supervisory optical signal belongs to an L band.

That a transmit apparatus 1107 generates the to-be-processed optical signal includes:

the transmit apparatus 1107 generates the classical optical signal and the supervisory optical signal, and attenuates the generated classical optical signal by using a VOA, to obtain an attenuated classical optical signal; and the transmit apparatus 1107 couples the attenuated classical optical signal and the supervisory optical signal by using the L band and C band multiplexer 2206, to obtain the to-be-processed optical signal.

In this case, when intercity quantum communication covering a relatively long distance is used, an optical amplification station is configured in an actual transmission process. In this case, because an intermediate node exists, the supervisory optical signal sent by the first optical supervisory channel 2207 is used to monitor a transmission line. First, this improves transmission security. Second, this is more compatible with a supervisory channel layout in the prior art. Third, because the supervisory optical signal belongs to the L band, and the band of the supervisory optical signal is relatively far away from a band of a quantum optical signal, the supervisory optical signal has little noise impact on the quantum optical signal.

Optionally, as shown in FIG. 2e, on a receive apparatus 1108 side, the to-be-processed optical signal further includes the supervisory optical signal, and the supervisory optical signal belongs to the L band.

That a receive apparatus 1108 determines the classical optical signal from the to-be-processed optical signal includes:

the receive apparatus 1108 demultiplexes the to-be-processed optical signal by using an L band and C band demultiplexer 2306, to obtain the supervisory optical signal and a demultiplexed optical signal; and the receive apparatus 1108 amplifies the demultiplexed optical signal by using an OA, to obtain the classical optical signal.

In this case, when intercity quantum communication covering a relatively long distance is used, an optical amplification station is configured in an actual transmission process. In this case, because an intermediate node exists, the supervisory optical signal received by a second optical supervisory channel 2307 is used to monitor a transmission line. First, this improves transmission security. Second, this is more compatible with a supervisory channel layout in the prior art. Third, because the supervisory optical signal belongs to the L band, and the band of the supervisory optical signal is relatively far away from a band of a quantum optical signal, the supervisory optical signal has little noise impact on the quantum optical signal. Fourth, successful separation of the classical optical signal and the supervisory optical signal is implemented, so that the classical optical signal and the supervisory optical signal can be processed separately and implement their respective functions.

Figure 2F:
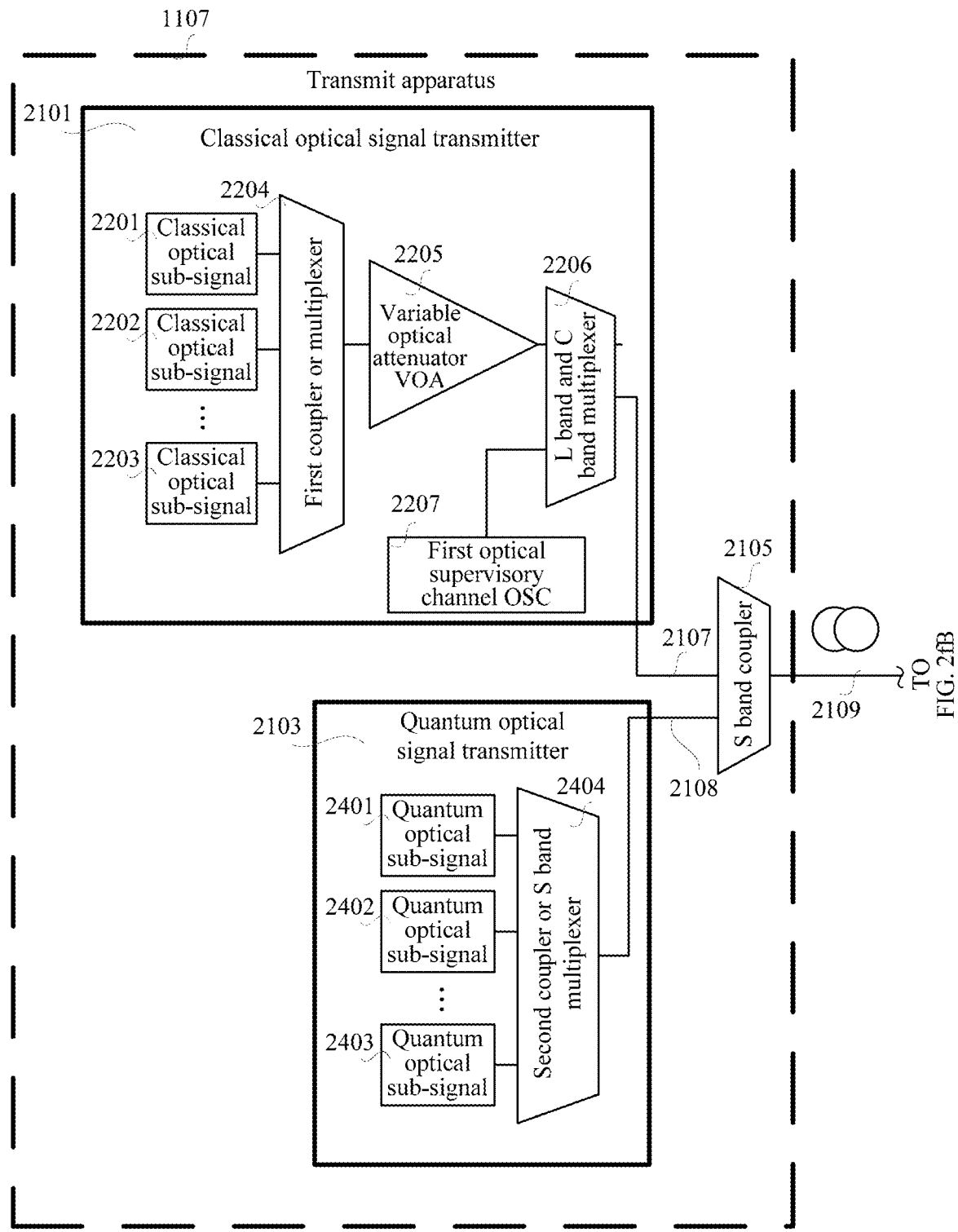
FIG. 2fA and FIG. 2fB are a schematic structural diagram of another quantum communications system according to an embodiment of the present disclosure.
Figure 2F:
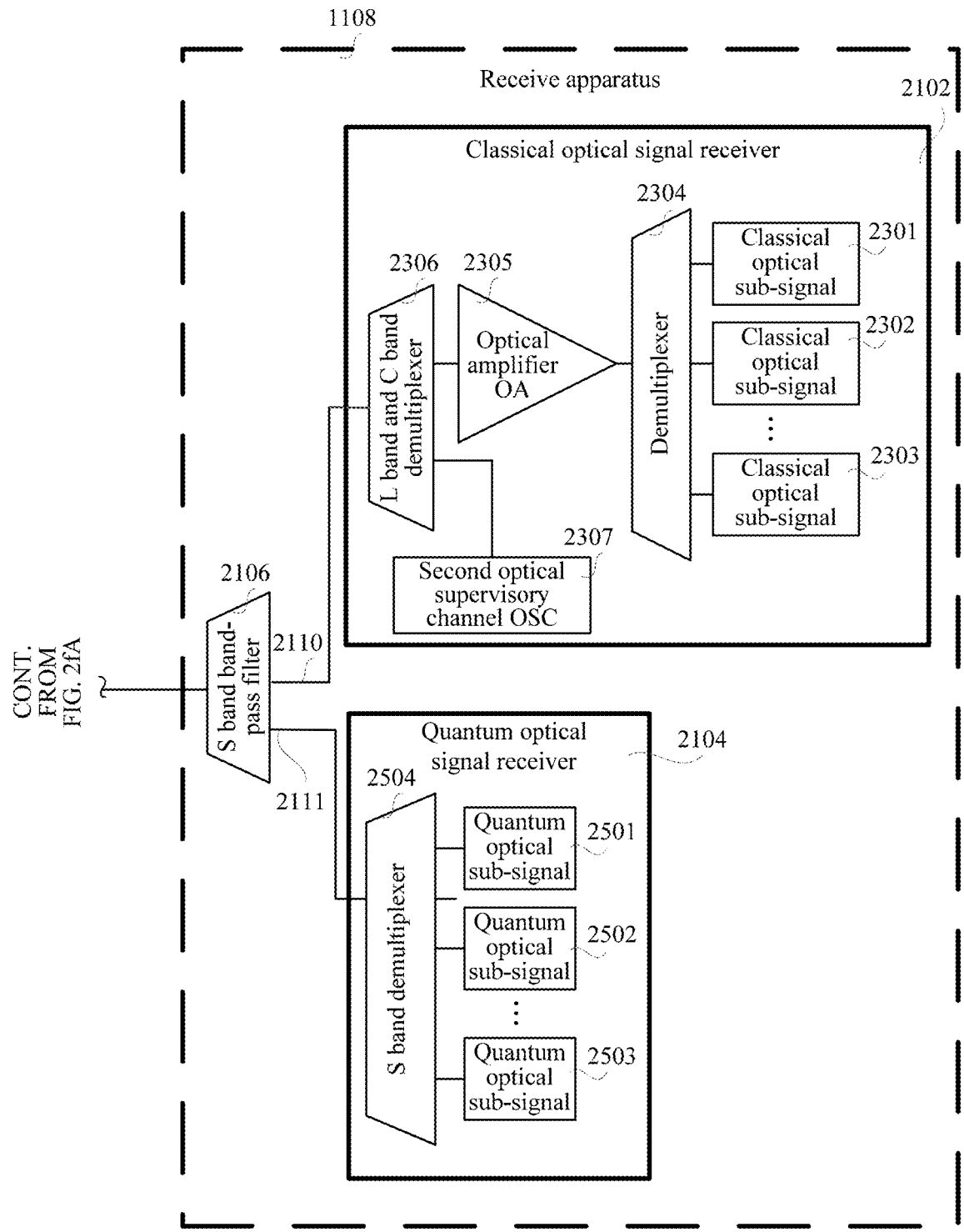

FIG. 2fA and FIG. 2fB show an example of a schematic structural diagram of another quantum communications system according to an embodiment of the present disclosure. As shown in FIG. 2fA and FIG. 2fB, optionally, on a transmit apparatus 1107 side, when there are a plurality of classical optical sub-signals of different wavelengths, that a transmit apparatus 1107 generates a classical optical signal includes: The transmit apparatus 1107 couples the plurality of classical optical sub-signals by using a first coupler or a multiplexer 2204, to obtain the classical optical signal. The multiplexer 2204 meets any one of the following conditions:

when the plurality of classical optical sub-signals include a classical optical sub-signal whose wavelength is in a C band, the multiplexer 2204 is a C band multiplexer;

when the plurality of classical optical sub-signals include a classical optical sub-signal whose wavelength is in an L band, the multiplexer 2204 is an L band multiplexer; or when the plurality of classical optical sub-signals include a classical optical sub-signal whose wavelength is in a C band and a classical optical sub-signal whose wavelength is in an L band, the multiplexer 2204 is an L band and C band multiplexer.

Optionally, the transmit apparatus 1107 couples the plurality of classical optical sub-signals by using the first coupler or the multiplexer 2204, to obtain the classical optical signal. In this way, the communications system can be further simplified and easy to operate, and an insertion loss in the system is further reduced.

In this case, a plurality of classical optical sub-signals, such as a classical optical sub-signal 2201, a classical optical sub-signal 2202, and a classical optical sub-signal 2203 in FIG. 2fA, may be sent simultaneously by using a plurality of wavelengths. The plurality of classical optical sub-signals are coupled by using the first coupler or the multiplexer 2204, and a coupled optical signal is transmitted by using an optical fiber. In this way, more classical optical sub-signals may be transmitted simultaneously. In this embodiment of the present disclosure, classical information may be any one or more of negotiation information, service information, and a synchronization clock signal, and each classical optical sub-signal may also be any one or more of the negotiation information, the service information, and the synchronization clock signal. Specifically, for example, a classical optical sub-signal may be negotiation information used by a receive apparatus and the transmit apparatus to negotiate a quantum key, or service information encrypted by using a quantum key.

Optionally, on a receive apparatus 1108 side, when there are a plurality of classical optical sub-signals of different wavelengths, after the receive apparatus 1108 determines the classical optical signal from a coupled optical signal, the receive apparatus 1108 demultiplexes the classical optical signal by using a demultiplexer 2304, to obtain the plurality of classical optical sub-signals included in the classical optical signal. The demultiplexer meets any one of the following conditions:

when the plurality of classical optical sub-signals include a classical optical sub-signal whose wavelength is in the C band, the demultiplexer is a C band demultiplexer;

when the plurality of classical optical sub-signals include a classical optical sub-signal whose wavelength is in the L band, the demultiplexer is an L band demultiplexer; or when the plurality of classical optical sub-signals include a classical optical sub-signal whose wavelength is in the C band and a classical optical sub-signal whose wavelength is in the L band, the demultiplexer is an L band and C band demultiplexer.

In this case, a plurality of classical optical sub-signals, such as a classical optical sub-signal 2301, a classical optical sub-signal 2302, and a classical optical sub-signal 2303 in FIG. 2fB, may be received simultaneously by using a plurality of wavelengths. The plurality of classical optical sub-signals are separated by using the demultiplexer 2304. In this way, more classical optical sub-signals may be transmitted simultaneously.

As shown in FIG. 2fA, optionally, on the transmit apparatus 1107 side, when there are a plurality of quantum optical sub-signals of different wavelengths, that the transmit apparatus 1107 generates a quantum optical signal includes: The transmit apparatus 1107 couples the plurality of quantum optical sub-signals by using a second coupler or an S band multiplexer 2404, to obtain the quantum optical signal.

Optionally, the transmit apparatus 1107 couples, by using the second coupler, the plurality of quantum optical sub-signals, such as a quantum optical sub-signal 2401, a quantum optical sub-signal 2402, and a quantum optical sub-signal 2403 in FIG. 2fA, to obtain the quantum optical signal. In this way, the communications system can be further simplified and easy to operate, and the insertion loss in the system is further reduced. In this embodiment of the present disclosure, the quantum optical signal may be an optical signal whose quantum state is an information carrier, for example, may be a group of random numbers. The group of random numbers may be used to generate the final quantum key. In this embodiment of the present disclosure, each quantum optical sub-signal may be an optical signal whose quantum state is an information carrier. For example, a quantum optical sub-signal may be a group of random numbers, and the group of random numbers may be used to generate the final quantum key.

Compared with a solution in which the quantum optical signal is separately transmitted, hybrid transmission of the quantum optical signal and the classical optical signal in one optical fiber inevitably causes specific noise impact to the quantum optical signal, and reduces a generation rate of the quantum key. To further improve the generation rate of the quantum key, in this embodiment of the present disclosure, a plurality of wavelengths are used to transmit a plurality of quantum optical sub-signals simultaneously, thereby improving a transmission rate of the quantum optical sub-signals, and improving the generation rate of the quantum key. In this way, more classical optical signals can be encrypted, improving communication efficiency of quantum communication.

As shown in FIG. 2fB, optionally, on the receive apparatus 1108 side, when there are a plurality of quantum optical sub-signals of different wavelengths, after the receive apparatus 1108 determines the quantum optical signal from the coupled optical signal, the receive apparatus 1108 demultiplexes the quantum optical signal by using an S band demultiplexer 2504, to obtain the plurality of quantum optical sub-signals included in the quantum optical signal, for example, a quantum optical sub-signal 2501, a quantum optical sub-signal 2502, and a quantum optical sub-signal 2503 in FIG. 2fB.

Compared with a solution in which the quantum optical signal is separately transmitted, hybrid transmission of the quantum optical signal and the classical optical signal in one optical fiber inevitably causes specific noise impact to the quantum optical signal, and reduces a generation rate of the quantum key. To further improve the generation rate of the quantum key, in this embodiment of the present disclosure, a plurality of wavelengths are used to transmit a plurality of quantum optical sub-signals simultaneously, thereby improving a transmission rate of the quantum optical sub-signals, and improving the generation rate of the quantum key. In this way, more classical optical signals can be encrypted, improving communication efficiency of quantum communication.

During specific implementation, when the S band demultiplexer 2504 is used to demultiplex the quantum optical signal, a bandwidth of each sub-band of the S band demultiplexer 2504 and stability of a laser that outputs the quantum optical signal need to be balanced. Because of impact of various uncertainties, such as a temperature change, an atmospheric change, mechanical vibration, or a magnetic field change, actually, a laser frequency of the quantum optical signal is obviously drifted. If the S band demultiplexer 2504 in this embodiment of the present disclosure is not used, but an ultra-narrowband band-pass filter is used, a center wavelength of the quantum optical signal may easily drift out of a filtering range of the ultra-narrowband band-pass filter. Consequently, the ultra-narrowband band-pass filter also filters the quantum optical signal, leading to a failure to transmit the quantum optical signal. In addition, the ultra-narrowband band-pass filter has a relatively high loss. However, on the other hand, if the bandwidth of each sub-band of the S band demultiplexer 2504 is relatively large, more noise photons are leaked to a quantum optical signal detector, thereby affecting a final key rate of the final quantum key. Optionally, a bandwidth range of each sub-band of the S band demultiplexer 2504 is from 0.1 nm to 5 nm. In actual application, the bandwidth of each sub-band of the S band demultiplexer 2504 may be 0.6 nm. In this case, factors such as system stability, a wavelength range and an insertion loss of the S band demultiplexer 2504 may be considered. The bandwidth of each sub-band of the S band demultiplexer 2504 configured in this embodiment of the present disclosure can ensure that the center wavelength of the laser does not easily drift out of the wavelength range of the S band demultiplexer 2504, thereby ensuring the stability of the communications system. In addition, the S band demultiplexer 2504 has a relatively low loss, thereby increasing a secure distance of quantum communication. Third, the bandwidth of each sub-band of the S band demultiplexer 2504 is relatively small, and therefore, not many noise photons are leaked to the quantum optical signal detector, thereby improving the final key rate of the quantum key.

Based on the foregoing description, to describe this embodiment of the present disclosure more clearly, the following describes this embodiment of the present disclosure in detail by using FIG. 2fA and FIG. 2fB as an example.

As shown in FIG. 2fA and FIG. 2fB, on the transmit apparatus 1107 side:

Optionally, when there are a plurality of classical optical sub-signals of different wavelengths, the plurality of classical optical sub-signals are coupled by using the first coupler or the multiplexer 2204, to obtain a classical optical signal. Then, the classical optical signal is attenuated by using a variable optical attenuator 2205, to obtain an attenuated classical optical signal. A first optical supervisory channel 2207 generates a supervisory optical signal. An L band and C band multiplexer 2206 couples the attenuated classical optical signal and the supervisory optical signal to obtain a to-be-processed optical signal, and transmits the to-be-processed optical signal in a first sub optical fiber 2107.

Optionally, when there are a plurality of quantum optical sub-signals of different wavelengths, the plurality of quantum optical sub-signals are coupled by using the second coupler or the S band multiplexer 2404, to obtain a quantum optical signal. The quantum optical signal is transmitted in a second sub optical fiber 2108.

The transmit apparatus 1107 couples, by using an S band coupler 2105 on an optical fiber 2109, the to-be-processed optical signal transmitted in the first sub optical fiber 2107 in the optical fiber 2109 and the quantum optical signal transmitted in the second sub optical fiber 2108 in the optical fiber 2109, to obtain a coupled optical signal.

The transmit apparatus 1107 sends the coupled optical signal by using the optical fiber.

On the receive apparatus 1108 side:

The receive apparatus 1108 receives the coupled optical signal by using the optical fiber.

By using an S band band-pass filter 2106 on the optical fiber 2109, the receive apparatus 1108 separates the quantum optical signal in the coupled optical signal to a fourth sub optical fiber 2111 in the optical fiber 2109, and separates the to-be-processed optical signal in the coupled optical signal to a third sub optical fiber 2110 in the optical fiber 2109 for processing.

The receive apparatus 1108 demultiplexes the to-be-processed optical signal by using an L band and C band demultiplexer 2306, to obtain the supervisory optical signal and a demultiplexed optical signal.

The receive apparatus 1108 amplifies the demultiplexed optical signal by using an OA, to obtain the classical optical signal.

The receive apparatus 1108 demultiplexes the quantum optical signal by using the S band demultiplexer 2504, to obtain the plurality of quantum optical sub-signals included in the quantum optical signal.

The receive apparatus 1108 and the transmit apparatus 1107 further determine a quantum key based on the classical optical signal, the quantum optical signal, or the supervisory optical signal received by the receive apparatus 1108 and the transmit apparatus 1107. Then, the transmit apparatus 1107 encrypts service information by using the quantum key, and sends encrypted service information to the receive apparatus 1108; and the receive apparatus 1108 decrypts the encrypted service information by using the determined quantum key, to obtain the service information.

It can be learned from the foregoing content that, because a wavelength of the classical optical signal is in the L band and/or the C band and a wavelength of the quantum optical signal is in an S band, a wavelength in the band of the classical optical signal is greater than a wavelength in the band of the quantum optical signal. Therefore, the quantum optical signal may be in an anti-Strokes scattering region. In addition, a scattering intensity of the anti-Strokes scattering region is relatively low, and therefore, impact of Raman noise on the quantum optical signal can be effectively reduced, and quality of the quantum optical signal is improved when hybrid transmission of the classical optical signal and the quantum optical signal is performed by using one optical fiber.

Figure 3:
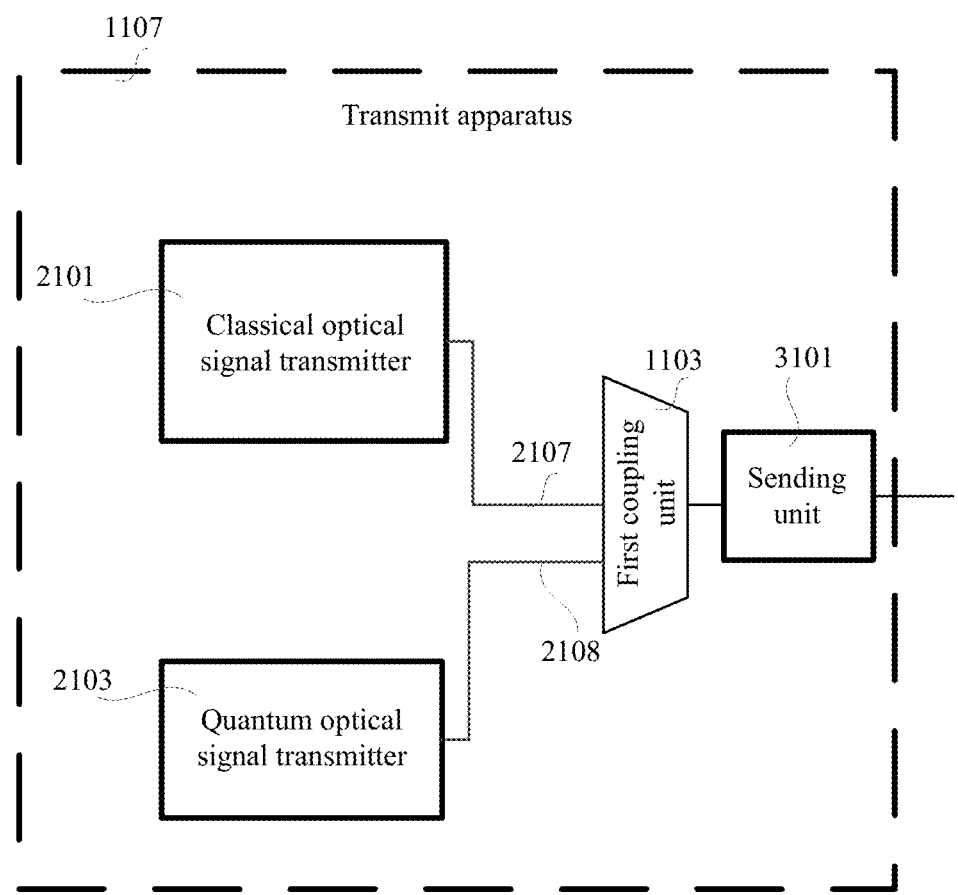
FIG. 3 is a schematic structural diagram of a transmit apparatus according to an embodiment of the present disclosure.

FIG. 3 shows an example of a schematic structural diagram of a transmit apparatus 1107 for quantum communication according to an embodiment of the present disclosure.

Based on a same conception, this embodiment of the present disclosure provides a transmit apparatus 1107 for quantum communication. As shown in FIG. 3, the transmit apparatus 1107 includes a classical optical signal transmitter 2101, a quantum optical signal transmitter 2103, a first coupling unit 1103, and a sending unit 3101.

The classical optical signal transmitter 2101 is configured to generate a to-be-processed optical signal.

The quantum optical signal transmitter 2103 is configured to generate a quantum optical signal. The to-be-processed optical signal includes at least a classical optical signal, and a wavelength of the quantum optical signal is in an S band.

The first coupling unit 1103 is configured to couple the to-be-processed optical signal and the quantum optical signal, to obtain a coupled optical signal.

The sending unit 3101 is configured to send the coupled optical signal by using an optical fiber.

Optionally, a wavelength of the classical optical signal is in any one of the following bands: a C band; an L band; or the L band and the C band.

Optionally, the first coupling unit 1103 is specifically configured to:

couple, by using an S band coupler 2105 on an optical fiber 2109, the to-be-processed optical signal transmitted in a first sub optical fiber 2107 in the optical fiber 2109 and the quantum optical signal transmitted in a second sub optical fiber 2108 in the optical fiber 2109, to obtain the coupled optical signal.

Optionally, the classical optical signal transmitter 2101 is specifically configured to:

generate the classical optical signal; and attenuate the generated classical optical signal by using a VOA, to obtain the to-be-processed optical signal.

Optionally, the to-be-processed optical signal further includes a supervisory optical signal, and the supervisory optical signal belongs to the L band.

The classical optical signal transmitter 2101 is specifically configured to:

generate the classical optical signal and the supervisory optical signal;

attenuate the generated classical optical signal by using a VOA, to obtain an attenuated classical optical signal; and couple the attenuated classical optical signal and the supervisory optical signal by using an L band and C band multiplexer 2206, to obtain the to-be-processed optical signal.

Optionally, when there are a plurality of classical optical sub-signals of different wavelengths, the classical optical signal transmitter 2101 is specifically configured to:

couple the plurality of classical optical sub-signals by using a first coupler or a multiplexer 2204, to obtain the classical optical signal, where the multiplexer meets any one of the following conditions:

when the plurality of classical optical sub-signals include a classical optical sub-signal whose wavelength is in the C band, the multiplexer is a C band multiplexer;

when the plurality of classical optical sub-signals include a classical optical sub-signal whose wavelength is in the L band, the multiplexer is an L band multiplexer; or when the plurality of classical optical sub-signals include a classical optical sub-signal whose wavelength is in the C band and a classical optical sub-signal whose wavelength is in the L band, the multiplexer is an L band and C band multiplexer.

Optionally, when there are a plurality of quantum optical sub-signals of different wavelengths, the quantum optical signal transmitter 2103 is specifically configured to:

couple the plurality of quantum optical sub-signals by using a second coupler or an S band multiplexer 2404, to obtain the quantum optical signal.

It can be learned from the foregoing content that, in this embodiment of the present disclosure, because the wavelength of the classical optical signal is in the L band and/or the C band and the wavelength of the quantum optical signal is in the S band, a wavelength in the band of the classical optical signal is greater than a wavelength in the band of the quantum optical signal. Therefore, the quantum optical signal may be in an anti-Strokes scattering region. In addition, a scattering intensity of the anti-Strokes scattering region is relatively low, and therefore, impact of Raman noise on the quantum optical signal can be effectively reduced, and quality of the quantum optical signal is improved when hybrid transmission of the classical optical signal and the quantum optical signal is performed by using one optical fiber.

Figure 4:
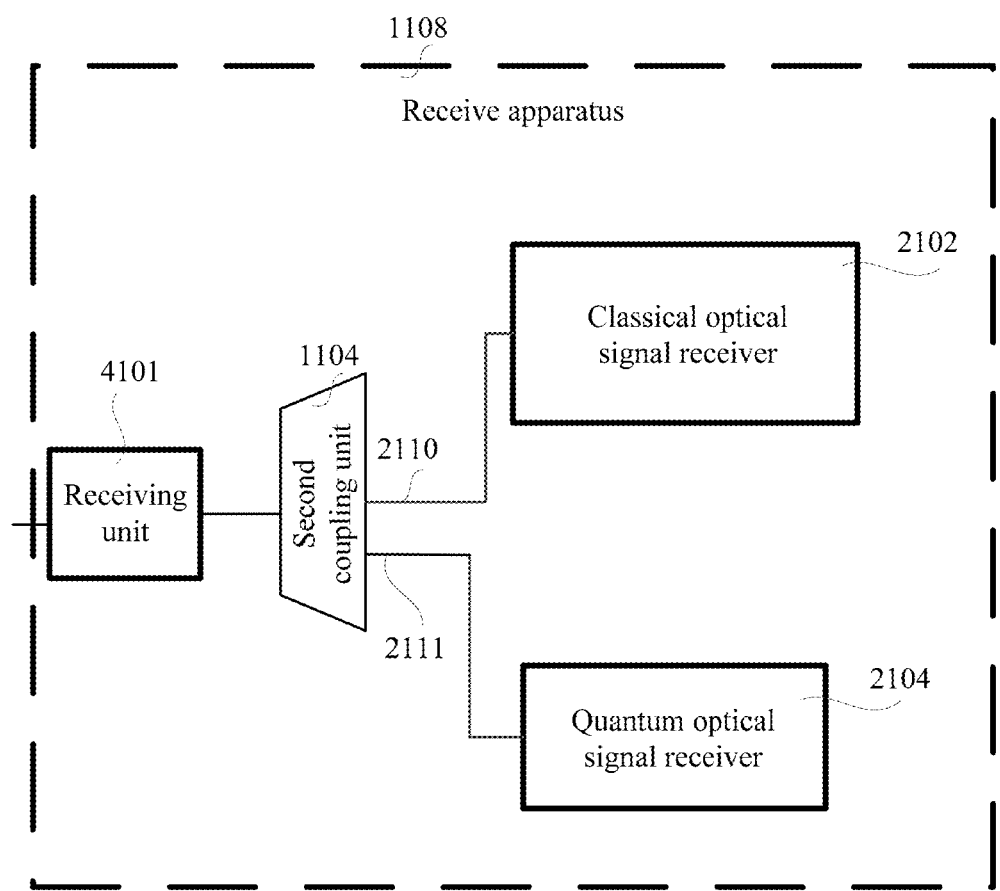
FIG. 4 is a schematic structural diagram of a receive apparatus according to an embodiment of the present disclosure.

FIG. 4 shows an example of a schematic structural diagram of a receive apparatus 1108 for quantum communication according to an embodiment of the present disclosure.

Based on a same conception, this embodiment of the present disclosure provides a receive apparatus 1108 for quantum communication. As shown in FIG. 4, the receive apparatus 1108 includes a classical optical signal receiver 2102, a quantum optical signal receiver 2104, a second coupling unit 1104, and a receiving unit 4101.

The receiving unit 4101 is configured to receive, by using an optical fiber, a coupled optical signal sent by a transmit apparatus 1107, where the coupled optical signal includes a to-be-processed optical signal and a quantum optical signal, the to-be-processed optical signal includes at least a classical optical signal, and a wavelength of the quantum optical signal is in an S band.

The second coupling unit 1104 is configured to determine the to-be-processed optical signal and the quantum optical signal from the coupled optical signal.

The classical optical signal receiver 2102 is configured to: receive the to-be-processed optical signal output by the second coupling unit 1104, and determine the classical optical signal from the to-be-processed optical signal.

The quantum optical signal receiver 2104 is configured to receive and process the quantum optical signal output by the second coupling unit 1104.

Optionally, a wavelength of the classical optical signal is in any one of the following bands: a C band; an L band; or the L band and the C band.

Optionally, the second coupling unit 1104 is specifically configured to:
separate the quantum optical signal in the coupled optical signal to a fourth sub optical fiber 2111 in an optical fiber 2109 by using an S band band-pass filter 2106 on the optical fiber 2109; separate, by using the S band band-pass filter 2106 on the optical fiber 2109, the to-be-processed optical signal in the coupled optical signal to a third sub optical fiber 2110 in the optical fiber 2109 for processing; and determine the classical optical signal from the to-be-processed optical signal.

Optionally, a bandwidth range of the S band band-pass filter 2106 is from 0.1 nm to 70 nm.

Optionally, the classical optical signal receiver 2102 is specifically configured to:
amplify the to-be-processed optical signal by using an OA, to obtain the classical optical signal.

Optionally, the to-be-processed optical signal further includes a supervisory optical signal, and the supervisory optical signal belongs to the L band.

The classical optical signal receiver 2102 is specifically configured to:
demultiplex the to-be-processed optical signal by using an L band and C band demultiplexer 2306, to obtain the supervisory optical signal and a demultiplexed optical signal; and
amplify the demultiplexed optical signal by using an OA, to obtain the classical optical signal.

Optionally, when there are a plurality of classical optical sub-signals of different wavelengths,
the classical optical signal receiver 2102 is further configured to:
demultiplex the classical optical signal by using a demultiplexer 2304, to obtain the plurality of classical optical sub-signals included in the classical optical signal, where the demultiplexer meets any one of the following conditions:
when the plurality of classical optical sub-signals include a classical optical sub-signal whose wavelength is in the C band, the demultiplexer is a C band demultiplexer;
when the plurality of classical optical sub-signals include a classical optical sub-signal whose wavelength is in the L band, the demultiplexer is an L band demultiplexer; or
when the plurality of classical optical sub-signals include a classical optical sub-signal whose wavelength is in the C band and a classical optical sub-signal whose wavelength is in the L band, the demultiplexer is an L band and C band demultiplexer.

Optionally, when there are a plurality of quantum optical sub-signals of different wavelengths,
the quantum optical signal receiver 2104 is further configured to:
demultiplex the quantum optical signal by using an S band demultiplexer 2504, to obtain the plurality of quantum optical sub-signals included in the quantum optical signal.

Optionally, a bandwidth range of each sub-band of the S band demultiplexer is from 0.1 nm to 5 nm.

It can be learned from the foregoing content that, because the wavelength of the classical optical signal is in the L band and/or the C band and the wavelength of the quantum optical signal is in the S band, a wavelength in the band of the classical optical signal is greater than a wavelength in the band of the quantum optical signal. Therefore, the quantum optical signal may be in an anti-Strokes scattering region. In addition, a scattering intensity of the anti-Strokes scattering region is relatively low, and therefore, impact of Raman noise on the quantum optical signal can be effectively reduced, and quality of the quantum optical signal is improved when hybrid transmission of the classical optical signal and the quantum optical signal is performed by using one optical fiber.

Persons skilled in the art should understand that the embodiments of the present disclosure may be provided as a method, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a CD-ROM, an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may alternatively be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of the present disclosure have been described, persons skilled in the art can make changes and modifications to these embodiments once they learn the basic inventive concept. Therefore, the following claims are intended to be construed as to cover the embodiments and all changes and modifications falling within the scope of the present disclosure.

Obviously, persons skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A transmit apparatus for quantum communication, the transmit apparatus comprising:
   a classical optical signal transmitter, configured to generate a to-be-processed optical signal comprising at least one classical optical signal comprising at least one classical optical sub-signal, and wherein:
      when the at least one classical optical signal comprises one classical optical sub-signal, a wavelength of the one classical optical sub-signal is in a C band or an L band, and
      when the at least one classical optical signal comprises a plurality of classical optical sub-signals, the plurality of classical optical sub-signals meet any one of the following conditions:
         the plurality of classical optical sub-signals comprise a classical optical sub-signal whose wavelength is in the C band;
         the plurality of classical optical sub-signals comprise a classical optical sub-signal whose wavelength is in the L band; or
         the plurality of classical optical sub-signals comprise a classical optical sub-signal whose wavelength is in the C band and a classical optical sub-signal whose wavelength is in the L band;
   a quantum optical signal transmitter, configured to generate a quantum optical signal, wherein a wavelength of the quantum optical signal is only in an S band; and
   a first coupling unit, configured to couple the to-be-processed optical signal that is in the C band or the L band and the quantum optical signal that is only in the S band to obtain a coupled optical signal, and send the coupled optical signal by using an optical fiber.

2. The transmit apparatus according to claim 1, wherein the first coupling unit is configured to:
   couple, by using an S band coupler on the optical fiber, the to-be-processed optical signal transmitted in a first sub optical fiber in the optical fiber and the quantum optical signal transmitted in a second sub optical fiber in the optical fiber, to obtain the coupled optical signal.

3. The transmit apparatus according to claim 1, wherein the classical optical signal transmitter is configured to:
   generate the at least one classical optical signal; and
   attenuate the generated classical optical signal by using a variable optical attenuator (VOA), to obtain the to-be-processed optical signal.

4. The transmit apparatus according to claim 1, wherein when the to-be-processed optical signal further comprises a supervisory optical signal having a wavelength in the L band, the classical optical signal transmitter is configured to:
   generate the at least one classical optical signal and the supervisory optical signal,
   attenuate the generated classical optical signal by using a variable optical attenuator (VOA), to obtain an attenuated classical optical signal, and
   couple the attenuated classical optical signal and the supervisory optical signal by using an L band and C band multiplexer, to obtain the to-be-processed optical signal.

5. The transmit apparatus according to claim 3, wherein:
   the classical optical signal comprises a plurality of classical optical sub-signals of different wavelengths; and
   the classical optical signal transmitter is configured to:
      couple the plurality of classical optical sub-signals by using a first coupler or a multiplexer, to obtain the at least one classical optical signal, wherein the multiplexer meets any one of the following conditions:
         when the plurality of classical optical sub-signals comprise a classical optical sub-signal whose wavelength is in the C band, the multiplexer is a C band multiplexer,
         when the plurality of classical optical sub-signals comprise a classical optical sub-signal whose wavelength is in the L band, the multiplexer is an L band multiplexer, or
         when the plurality of classical optical sub-signals comprise a classical optical sub-signal whose wavelength is in the C band and a classical optical sub-signal whose wavelength is in the L band, the multiplexer is an L band and C band multiplexer.

6. The transmit apparatus according to claim 1, wherein the quantum optical signal comprises a plurality of quantum optical sub-signals of different wavelengths.

7. A quantum communication method, comprising:
   generating, by a transmit apparatus, a to-be-processed optical signal and a quantum optical signal, wherein a wavelength of the quantum optical signal is only in an S band;
   coupling, by the transmit apparatus, the to-be-processed optical signal and the quantum optical signal that is only the S band, to obtain a coupled optical signal; and
   sending, by the transmit apparatus, the coupled optical signal by using an optical fiber;
   wherein the to-be-processed optical signal comprises at least one classical optical signal comprising at least one classical optical sub-signal, and wherein:
      when the at least one classical optical signal comprises one classical optical sub-signal, a wavelength of the classical optical sub-signal is in a C band or an L band, and
      when the at least one classical optical signal comprises a plurality of classical optical sub-signals, the plurality of classical optical sub-signals meet any one of the following:
         the plurality of classical optical sub-signals comprise a classical optical sub-signal whose wavelength is in the C band;

the plurality of classical optical sub-signals comprise a classical optical sub-signal whose wavelength is in the L band; or the plurality of classical optical sub-signals comprise a classical optical sub-signal whose wavelength is in the C band and a classical optical sub-signal whose wavelength is in the L band.

8. The method according to claim 7, wherein coupling, by the transmit apparatus, the to-be-processed optical signal and the quantum optical signal, to obtain a coupled optical signal comprises:

coupling, by the transmit apparatus by using an S band coupler on the optical fiber, the to-be-processed optical signal transmitted in a first sub optical fiber in the optical fiber and the quantum optical signal transmitted in a second sub optical fiber in the optical fiber, to obtain the coupled optical signal.

9. The method according to claim 7, wherein generating, by a transmit apparatus, a to-be-processed optical signal comprises:

generating, by the transmit apparatus, the at least one classical optical signal; and attenuating the generated classical optical signal by using a variable optical attenuator (VOA), to obtain the to-be-processed optical signal.

10. The method according to claim 9, wherein:

the at least one classical optical signal comprises a plurality of classical optical sub-signals of different wavelengths; and generating, by the transmit apparatus, the at least one classical optical signal comprises:

coupling, by the transmit apparatus, the plurality of classical optical sub-signals by using a first coupler or a multiplexer, to obtain the at least one classical optical signal, wherein the multiplexer meets any one of the following:

when the plurality of classical optical sub-signals comprise a classical optical sub-signal whose wavelength is in the C band, the multiplexer is a C band multiplexer;

when the plurality of classical optical sub-signals comprise a classical optical sub-signal whose wavelength is in the L band, the multiplexer is an L band multiplexer; or when the plurality of classical optical sub-signals comprise a classical optical sub-signal whose wavelength is in the C band and a classical optical sub-signal whose wavelength is in the L band, the multiplexer is an L band and C band multiplexer.

11. The method according to claim 7, wherein:

the to-be-processed optical signal further comprises a supervisory optical signal having a wavelength in the L band; and generating, by a transmit apparatus, a to-be-processed optical signal comprises:

generating, by the transmit apparatus, the at least one classical optical signal and the supervisory optical signal, attenuating the generated at least one classical optical signal by using a variable optical attenuator (VOA), to obtain an attenuated classical optical signal, and coupling, by the transmit apparatus, the attenuated classical optical signal and the supervisory optical signal by using an L band and C band multiplexer, to obtain the to-be-processed optical signal.

12. The method according to claim 7, wherein:

the quantum optical signal comprise a plurality of quantum optical sub-signals of different wavelengths; and generating, by a transmit apparatus, a quantum optical signal comprises:

coupling, by the transmit apparatus, the plurality of quantum optical sub-signals by using a second coupler or an S band multiplexer, to obtain the quantum optical signal.

\* \* \* \* \*